(12) United States Patent
von Tiedemann et al.

(10) Patent No.: US 12,037,438 B2
(45) Date of Patent: Jul. 16, 2024

(54) STAR POLYMERS HAVING A SILYL COUPLING

(71) Applicant: JOHANNES GUTENBERG-UNIVERSITÄT MAINZ, Mainz (DE)

(72) Inventors: Philipp von Tiedemann, Mainz (DE); Holger Frey, Emmendingen (DE)

(73) Assignee: Johannes Gutenberg-Universität Mainz, Mainz (DE)

( * ) Notice: Subject to any disclaimer, the term of this patent is extended or adjusted under 35 U.S.C. 154(b) by 464 days.

(21) Appl. No.: 17/275,141

(22) PCT Filed: Sep. 2, 2019

(86) PCT No.: PCT/EP2019/073330
§ 371 (c)(1),
(2) Date: Mar. 10, 2021

(87) PCT Pub. No.: WO2020/053014
PCT Pub. Date: Mar. 19, 2020

(65) Prior Publication Data
US 2022/0041785 A1    Feb. 10, 2022

(30) Foreign Application Priority Data
Sep. 11, 2018   (DE) .................... 10 2018 122 077.4

(51) Int. Cl.
C08F 297/02     (2006.01)
C08F 8/26       (2006.01)
C08F 297/04     (2006.01)

(52) U.S. Cl.
CPC ............ C08F 297/044 (2013.01); C08F 8/26 (2013.01); C08F 297/046 (2013.01); *C08F 2438/00* (2013.01)

(58) Field of Classification Search
CPC .............. C08F 297/044; C08F 297/046; C08F 2438/00; C08F 8/26
See application file for complete search history.

(56) References Cited

U.S. PATENT DOCUMENTS

2005/0209408 A1    9/2005   Lee
2009/0118436 A1    5/2009   Niitani

OTHER PUBLICATIONS

Clarke, et al. "Self-Diffusion and Viscoelastic Measurements of Polystyrene Star Polymers," Macromolecules, vol. 39, No. 3, Dec. 31, 2005, pp. 1290-1296.
Wei et al. "Polyaniline nanoparticles doped with star-like poly(styrene sulfonate): Synthesis and electrochromic properties," Solar Energy Materials and Solar Cells., NL, vol. 9, Jun. 3, 2011, pp. 141-147.
International Search Report for PCT/EP2019/073330, filed Sep. 2, 2019.

(Continued)

*Primary Examiner* — Caixia Lu
(74) *Attorney, Agent, or Firm* — ProPat, LLC; Cathy Moore

(57) ABSTRACT

The present invention relates to methods of forming star polymers having configurable architecture in which arms are synthesized by means of living anionic polymerization, with the arms being conjugated with a core, the core comprising m coupling groups, each coupling group having n methylene groups. The invention further relates to star polymers produced therefrom.

15 Claims, 18 Drawing Sheets

(56) References Cited

OTHER PUBLICATIONS

A. B. Burns, et al., "Strategies for the Synthesis of Well-Defined Star Polymers by Anionic Polymerization with Chlorosilane Coupling and Preservation of the Star Architecture during Catalytic Hydrogenation," Macromolecules 2016, 49 (6) 2063.

STAR POLYMERS HAVING A SILYL COUPLING

CROSS-REFERENCE TO RELATED APPLICATIONS

This application is being filed under 35 U.S.C. § 371 as a National Stage Application of pending International Application No. PCT/EP2019/073330 filed Sep. 2, 2019, which claims priority to parent application German Patent Application No. 10 2018 122 077.4, filed Sep. 11, 2018. Both International Application No. PCT/EP2019/073330 and German Patent Application No. 10 2018 122 077.4 are hereby incorporated by reference herein in their entirety.

FIELD OF THE INVENTION

The present invention relates to a process for producing star polymers comprising the steps of
(a) provision of a reaction mixture comprising one or more solvents, p mol of an initiator $I^{(-)}Z^{(+)}$ and q mol of a monomer A or q mol of a monomer A and r mol of a monomer C where C≠A, wherein A and C are selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether;
(b) polymerization of A to afford $I\{poly(A)\}^{(-)}Z^{(+)}$ or polymerization of A and C to afford $I\{poly(A\text{-stat-}C)\}^{(-)}Z^{(+)}$ by living anionic polymerization;
(c) optional addition of monomers B to the reaction mixture and living anionic polymerization of $I\{poly(A)\}^{(-)}Z^{(+)}$ to afford $I\{poly(A)poly(B)\}^{(-)}Z^{(+)}$, wherein B is selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether and B A;
(d) optional addition of monomers A to the reaction mixture and living anionic polymerization of $I\{poly(A)poly(B)\}^{(-)}Z^{(+)}$ to afford $I\{poly(A)poly(B)poly(A)\}^{(-)}Z^{(+)}$;
(e) optional single or multiple performance of the step sequence (c)-(d);
(f) optional performance of step (c); and
(g) addition of s mol of a core K having m functionalities where m=2-16 to the reaction mixture and conjugation of $I\{poly(A)\}^{(-)}$, $I\{poly(A\text{-stat-}C)\}^{(-)}$ or $I\{poly(A)\text{-block-}poly(B)\}^{(-)}$ with K to afford a star polymer $[I\{poly(A)\}]_m K$, $[I\{poly(A\text{-stat-}C)\}]_m K$ or $[I\{poly(A)\text{-block-}poly(B)\}]_m K$.

The invention further relates to a star polymer P having 2 to 16 arms which each comprise a polymer chain X of the type $I\{poly(A)\}$-, $I\{poly(A\text{-stat-}C)\}$- or $I\{poly(A)\text{-block-}poly(B)\}$- formed from an initiator radical I and monomers A, C, B, wherein A, C, B are selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether.

BACKGROUND OF THE INVENTION

Star polymers and processes for production thereof are known in the art.

Star polymers such as STYROLUX® from BASF or SOLPRENE® from Philipps find commercial application as thermplastic elastomers (TPE) in packaging, coatings, foils and injection molded articles. STYROLUX® and SOLPRENE® contain blocks of monomers such as styrene and butadiene and are characterized by high transparency, toughness and strength. STYROLUX® is miscible with commercially available polystyrene (GPPS) and retains its transparency.

In addition to industrial applications star polymers are finding increasing use in biomedicine and in particular for pharmacological actives delivery and controlled release on account of their physical properties and complex morphology.

US 2005/0209408 A1 discloses a process for producing star polymers comprising the steps of synthesizing a living polymer anion having a degree of polymerization of 500 to 500 000 by reaction of an anionic polymerization initiator with at least one monomer selected from styrene, α-methylstyrene, o-methylstyrene, p-methylstyrene, p-tert-butylstyrene, butadiene, isoprene and cyclohexadiene; two or more additions of a coupling reagent selected from divinylbenzene, divinyltoluene, divinylbiphenyl and divinylnaphthalene; and reaction of the living polymer anion with the coupling reagent to afford a star polymer. A multi-star polymer produced by the process has the structural formula $[A_m\text{-}X_n]_p X_q A_r$ wherein A is a styrene monomer and X is a coupling reagent.

US 2009/0118436 A1 relates to a star polymer having a core and linear arms of a first and second generation, wherein the number of arms of the second generation is greater than the number of arms of the first generation and the arms of the first generation are made of monomers having a polymerizable double bond, such as styrene.

The synthesis of star polymers by "living" anionic polymerization according to the so-called "arm-first" method allows independent characterization of the "polymer arm" before coupling to a core which functions as a star center. However, in the "arm-first" method, the "living" polymer arms must generally be added in an excess of 1.2 to 1.8 equivalents (eq) to obtain star polymers of high functionality. A mixture of star polymers of different functionalities and excess polymer arms is therefore present after termination of the reaction. Isolation of the desired product requires costly and inconvenient fractionation.

A suitable method for preparing symmetrical star polymers is in principle coupling with halomethylbenzene derivatives, though this is limited to selected applications because of side reactions (lithium-halogen exchange). The coupling of "living" carbanionic polymer chains using 1,4-divinylbenzene affords disperse star polymers with a tightly crosslinked nodular 1,4-divinylbenzene core.

The coupling of polystyryllithium with known coupling reagents such as for example 1,2-bis(methyldichlorosilyl)ethane generally takes between 4 days and 2 weeks. Using 1,2-bis(trichlorosilyl)ethane results in much more difficult coupling which is not entirely complete even after four weeks. Such long reaction times require ultraclean glass apparatuses and highly complex processes using "breakseal" techniques.

Chlorosilane coupling reagents are suitable for the synthesis of well-defined star polymers due to the lack of side reactions. Star polymers having up to 128 polybutadiene arms have already been synthesized using known chlorosilane coupling reagents. However, the use of chlorosilane coupling reagents is associated with following disadvantages:

(i) the coupling reaction proceeds very slowly in nonpolar solvents (cyclohexane, benzene) frequently used in anionic polymerization;
(ii) the efficiency of the coupling is strongly dependent on the steric properties of the core and of the active ends of the "living" polymers.

Burns and Register (A. A. Burns, R. A. Register, *Strategies for the Synthesis of Well-Defined Star Polymers by Anionic Polymerization with Chlorosilane Coupling and Preservation of the Star Architecture during Catalytic Hydrogenation*, Macromolecules 2016, 49 (6) 2063) showed that the coupling of polyisoprenyl-lithium and polybutadienyl-lithium may be considerably accelerated by addition of tetrahydrofuran (THF). The coupling efficiency can also be increased by end group functionalization of "living" polymer chains with a few units of butadiene. However, functionalization with flammable butadiene is dangerous, complex and requires an additional process step.

Chlorosilane coupling reagents having methylene spacers have hitherto only been used for the synthesis of defined carbosilane dendrimers.

SUMMARY OF ADVANTAGEOUS EMBODIMENTS OF THE INVENTION

The process according to the invention is based on a rapid, stoichiometric and virtually quantitative coupling of "living" anionic polymers to a core having silyl-terminated coupling sites having alkyl spacers. The coupling of "living" carbanionic polymer chains using chlorosilane coupling reagents having methylene spacers and a plurality of monochlorosilyl groups is not known in the prior art.

It is an object of the present invention to overcome the above-described problems of the prior art and to provide an efficient process for production of well-defined star polymers.

DETAILED DESCRIPTION OF ADVANTAGEOUS EMBODIMENTS OF THE INVENTION

Figure 1:
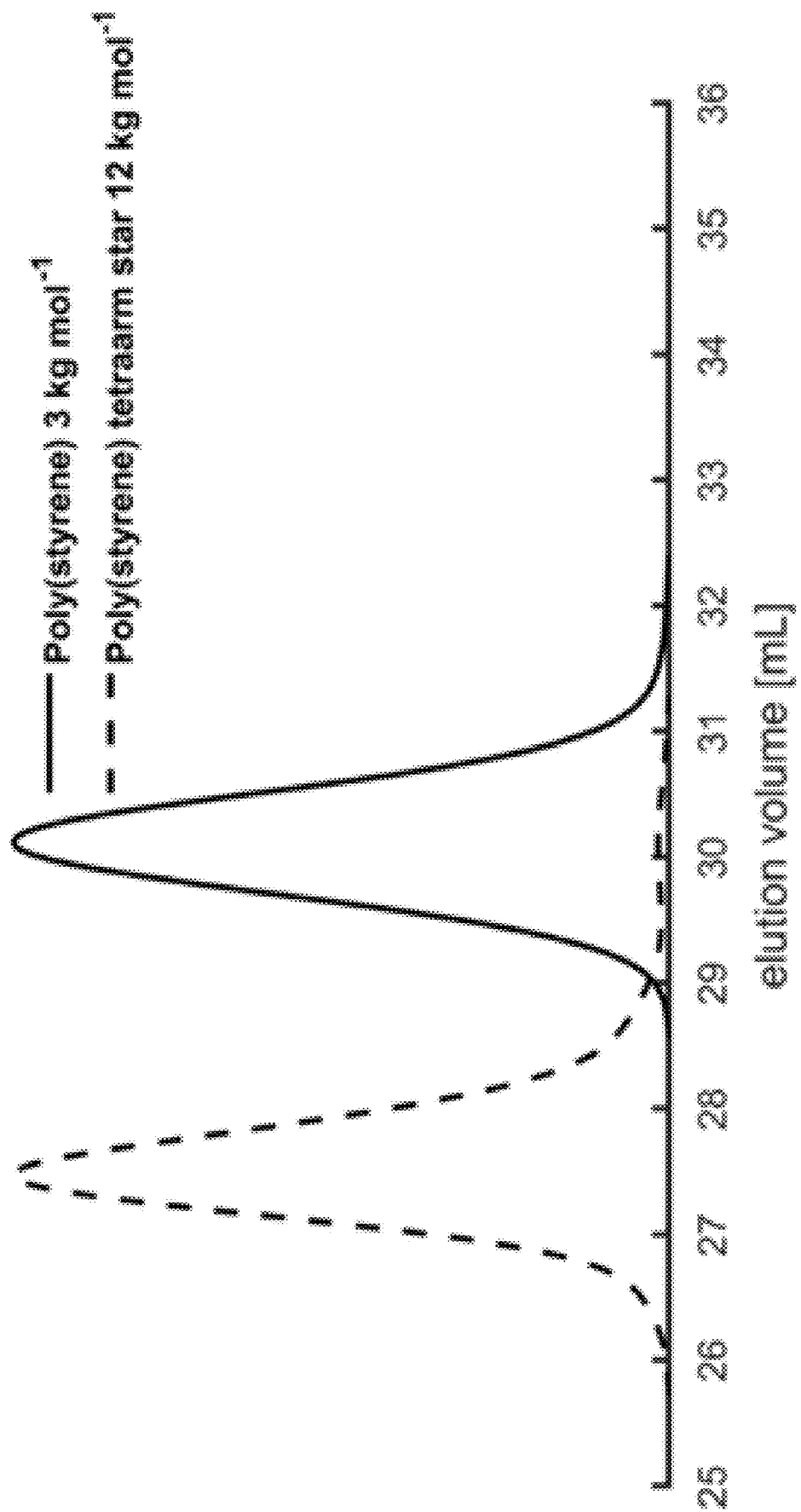
FIG. 1 is a graphical illustration of GPC elugrams for poly(styrene) and an exemplary four-armed star polymer produced therewith.

This object is achieved by a process comprising the steps of (a) provision of a reaction mixture comprising one or more solvents, p mol of an initiator $I^{(-)}Z^{(+)}$ and q mol of a monomer A or q mol of a monomer A and r mol of a monomer C where C≠A, wherein A and C are selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether;

(b) polymerization of A to afford $I\{poly(A)\}^{(-)}Z^{(+)}$ or polymerization of A and C to afford $I\{poly(A\text{-stat-}C)\}^{(-)}Z^{(+)}$ by living anionic polymerization;

(c) optional addition of monomers B to the reaction mixture and living anionic polymerization of $I\{poly(A)\}^{(-)}Z^{(+)}$ to afford $I\{poly(A)poly(B)\}^{(-)}Z^{(+)}$, wherein B is selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether and B A;

(d) optional addition of monomers A to the reaction mixture and living anionic polymerization of $I\{poly(A)poly(B)\}^{(-)}Z^{(+)}$ to afford $I\{poly(A)poly(B)poly(A)\}^{(-)}Z^{(+)}$;

(e) optional single or multiple performance of the step sequence (c)-(d);

(f) optional performance of step (c);

(g) addition of r mol of a core K to the reaction mixture and conjugation of $I\{poly(A)\}^{(-)}$, $I\{poly(A\text{-stat-}C)\}^{(-)}$ or $I\{poly(A)\text{-block-}poly(B)\}^{(-)}$ with K to afford a star polymer $[I\{poly(A)\}]_mK$, $[I\{poly(A\text{-stat-}C)\}]_mK$ or $[I\{poly(A)\text{-block-}poly(B)\}]_mK$;

wherein the core K has the structure

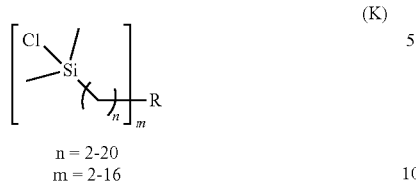

$$n = 2\text{-}20$$
$$m = 2\text{-}16$$

where m=2-16 coupling groups each having n=2-20 methylene groups.

Advantageous embodiments of the process according to the invention are characterized in that
the molar ratio q/p of monomer A to initiator $I^{(-)}Z^{(+)}$ is in the range of 12 to 4000;
the molar ratio q/p of monomer A to initiator $I^{(-)}Z^{(+)}$ in the range of 12 to 600, 300 to 900, 600 to 1200, 900 to 1500, 1200 to 1800, 1500 to 2100, 1800 to 2400, 2100 to 2700, 2400 to 3000, 2700 to 3300, 3000 to 3600 or 3300 to 4000;
the molar ratio (q+r)/p of monomers A and C to initiator $I^{(-)}Z^{(+)}$ is in the range of 12 to 4000;
the molar ratio (q+r)/p of monomers A and C to initiator $I^{(-)}Z^{(+)}$ is in the range of 12 to 600, 300 to 900, 600 to 1200, 900 to 1500, 1200 to 1800, 1500 to 2100, 1800 to 2400, 2100 to 2700, 2400 to 3000, 2700 to 3300, 3000 to 3600 or 3300 to 4000;
A, C, B are selected from the group comprising 1,3-butadiene, styrene and isoprene;
A is 1,3-butadiene, styrene or isoprene;
B is 1,3-butadiene, styrene or isoprene;
C is 1,3-butadiene, styrene or isoprene;
the monomer A contains a protected group of the type —$OP_A$ for hydroxy functionalization;
the monomer A contains a protected group of the type —$N(Q_A)_2$ for amine functionalization;
the monomer B contains a protected group of the type —$OP_B$ for hydroxy functionalization;
the monomer B contains a protected group of the type —$N(Q_B)_2$ for amine functionalization;
the monomer C contains a protected group of the type —$OP_C$ for amine functionalization;
the monomer C contains a protected group of the type —$N(Q_C)_2$ for amine functionalization;
$P_A$, $P_B$, $P_C$ are independently of one another selected from the group comprising trialkylsilyl groups, triethylsilyl (—$Si(CH_2CH_3)_3$), isopropyldimethylsilyl (—$Si(CH_3)_2C(CH_3)_2$), tert-butyldimethylsilyl (—$Si(CH_3)_2C(CH_3)_3$) and tert-butoxydimethylsilyl (—$Si(CH_3)_2OC(CH_3)_3$);
$Q_A$, $Q_B$, $Q_C$ are independently of one another selected from the group comprising trialkylsilyl groups, trimethylsilyl (—$Si(CH_3)_3$), triethylsilyl (—$Si(CH_2CH_3)_3$), isopropyldimethylsilyl (—$Si(CH_3)_2C(CH_3)_2$), tert-butyldimethylsilyl (—$Si(CH_3)_2C(CH_3)_3$) and tert-butoxydimethylsilyl (—$Si(CH_3)_2OC(CH_3)_3$);
the monomer A is protected styrene and the phenyl ring of the protected styrene comprises a protected group of the type —$OP_A$ or —$N(Q_A)_2$ in the ortho, meta or para position;
the monomer B is protected styrene and the phenyl ring of the protected styrene comprises a protected group of the type —$OP_B$ or —$N(Q_B)_2$ in the ortho, meta or para position;
the monomer C is protected styrene and the phenyl ring of the protected styrene comprises a protected group of the type —$OP_C$ or —$N(Q_C)_2$ in the ortho, meta or para position;
the number m of coupling groups of the core K is 2 to 4, 2 to 6, 2 to 8, 2 to 10, 2 to 12 or 2 to 14:
the number m of coupling groups of the core K is 2 to 4, 3 to 5, 4 to 6, 5 to 7, 6 to 8, 7 to 9, 8 to 10, 9 to 11, 10 to 12, 11 to 13, 12 to 14, 13 to 15 or 14 to 16;
the number m of coupling groups of the core K is 2, 3, 4, 5, 6, 7, 8, 9, 10, 11, 12, 13, 14, 15 or 16;
the number n of methylene groups per coupling group of the core K is 3 to 20;
the number n of methylene groups per coupling group of the core K is 3 to 6, 3 to 8, 3 to 10, 3 to 12, 3 to 14, 3 to 16 or 3 to 18;
the number n of methylene groups per coupling group of the core K is 2, 3, 4, 5, 6, 7, 8, 9, 10, 11, 12, 13, 14, 15, 16, 17, 18, 19 or 20;
the number n of methylene groups per coupling group of the core K is 3, 4, 5 or 6;
the anionic initiator radical $I^{(-)}$ is selected from the group comprising radical anions, carbanions and oxyanions;
the anionic initiator radical $I^{(-)}$ is selected from the group comprising methyl$^{(-)}$, n-butyl$^{(-)}$, s-butyl$^{(-)}$, t-butyl$^{(-)}$, anions of amides, anions of alkoxides, anions of sulfides, $NH_2^{(-)}$, $MeO^{(-)}$ and $MeS^{(-)}$;
the cationic initiator radical $Z^{(+)}$ is selected from the group comprising cations of sodium ($Na^+$), potassium ($K^+$), lithium ($Li^+$) and cesium ($Cs^+$);
the initiator $I^{(-)}Z^{(+)}$ is n-butyllithium (n-BuLi), sec-butyllithium (s-BuLi) or tert-butyllithium (t-BuLi);
the initiator $I^{(-)}Z^{(+)}$ is a Grignard compound R'-Mg-X' where X'=bromine (Br), chlorine (Cl) or iodine (I);
the initiator $I^{(-)}Z^{(+)}$ is isopropylmagnesium bromide;
the initiator $I^{(-)}Z^{(+)}$ is sodium naphthalide, potassium naphthalide, sodium 1,3-bis(1-phenylethenyl)benzene, lithium 1,3-bis(1-phenylethenyl)benzene or potassium 1,3-bis(1-phenylethenyl)benzene;
the initiator is sodium, potassium or cesium;
R is a radical of an m-fold functionalized compound;
R is a radical of an m-fold functionalized compound, wherein the compound comprises m functional end groups selected from hydroxy, carboxy, amino, isocyanate, epoxy and vinyl groups;
R is a radical of an alkane, aromatic, tertiary amine, cyclic tertiary amine, polymer, polyether, polysiloxane, block copolymer or of silicon (Si);
R is a radical of a telechelic oligomer;
R is a radical of a telechelic oligomer having two functional end groups (m=2) selected from the group comprising hydroxy, carboxy, amino, isocyanate, epoxy and vinyl radicals;
R in dimethyl sulfoxide has a $pK_a$ of 20 to 100;
R in tetrahydrofuran has a $pK_a$ of 20 to 100;
R is a radical of silicon (Si);
the core K in dimethyl sulfoxide has a $pK_a$ of 20 to 100;
the core K in tetrahydrofuran has a $pK_a$ of 20 to 100;
the reaction mixture contains one or more solvents selected from the group comprising benzene, hexane, cyclohexane, toluene, tetrahydrofuran and dioxane;
the reaction mixture contains the solvent tetrahydrofuran (THF);
the star polymer obtained in step (g) is deprotected by addition of an aqueous solution of 1,4-dioxane ($C_4H_8O_2$) and a small amount of acetic acid ($CH_3COOH$) or hydrochloric acid (HCl);

the reaction mixture provided in step (a) has a temperature of −20° C. to 0° C., −30° C. to −10° C., −40° C. to −20° C., −50° C. to −30° C., −60° C. to −40° C., −70° C. to −50° C., −80° C. to −60° C., −90° C. to −70° C. or −100° C. to −80° C.;

in step (b) the reaction mixture is heated to a temperature of 40° C. to 60° C., 50° C. to 70° C., 60° C. to 80° C., 70° C. to 90° C., 80° C. to 100° C. or 90° C. to 110° C.;

in one or more of steps (b) to (g) the reaction mixture, before the addition of monomers or of the core K, is cooled to a temperature of −20° C. to 0° C., −30° C. to −10° C., −40° C. to −20° C., −50° C. to −30° C., −60° C. to −40° C., −70° C. to −50° C., −80° C. to −60° C., −90° C. to −70° C. or −100° C. to −80° C.;

in one or more of steps (b) to (g) the reaction mixture is heated to a temperature of 40° C. to 60° C., 50° C. to 70° C., 60° C. to 80° C., 70° C. to 90° C., 80° C. to 100° C. or 90° C. to 110° C. to initiate living anionic polymerization or to conjugate the core K;

one or more of steps (b) to (g) are performed at a pressure of 90 000 to 110 000 Pa;

one or more of steps (b) to (g) are performed at a pressure of <90 000 Pa, <50 000 Pa or <10 000 Pa;

one or more of steps (b) to (g) are performed at a pressure of 100 000 to 1 000 000 Pa, 500 000 to 1 500 000 Pa or 1 000 000 to 3 000 000 bar;

step (g) is performed over a period of 30 seconds to 60 minutes;

step (g) is performed over a period of 30 seconds to 5 minutes, 30 seconds to 10 minutes, 30 seconds to 20 minutes, 10 to 30 minutes, 20 to 40 minutes, 30 to 50 minutes or 40 to 60 minutes.

The invention further relates to star polymers producible by any of the above-described processes.

It is a further object of the invention to provide a star polymer which is easy to synthesize and has a precisely configurable architecture.

This object is achieved by a star polymer of structure P

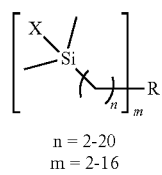

(P)

n = 2-20
m = 2-16 where m=2-16 arms each having n=2-20 methylene groups, wherein
the number m of arms of the star polymer P is 2 to 4, 2 to 6, 2 to 8, 2 to 10, 2 to 12 or 2 to 14;
the number m of arms of the star polymer P is 2 to 4, 3 to 5, 4 to 6, 5 to 7, 6 to 8, 7 to 9, 8 to 10, 9 to 11, 10 to 12, 11 to 13, 12 to 14, 13 to 15 or 14 to 16;
the number m of arms of the star polymer P is 2, 3, 4, 5, 6, 7, 8, 9, 10, 11, 12, 13, 14, 15 or 16;
the number n of methylene groups per arm of the star polymer P is 3 to 20;
the number n of methylene groups per arm of the star polymer P is 3 to 6, 3 to 8, 3 to 10, 3 to 12, 3 to 14, 3 to 16 or 3 to 18;
the number n of methylene groups per arm of the star polymer P is 3, 4, 5 or 6;
the number n of methylene groups per arm of the star polymer P is 2, 3, 4, 5, 6, 7, 8, 9, 10, 11, 12, 13, 14, 15, 16, 17, 18, 19 or 20;
R is a radical of an alkane, aromatic, tertiary amine, cyclic tertiary amine, polymer, polyether, polysiloxane, block copolymer or of silicon (Si); and
X has the structure I{poly(A)}-, I{poly(A-stat-C)}- where C A or I{poly(A)-block-poly(B)}- where B≠A and A, C, B are selected from the group comprising dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether.

Advantageous embodiments of the star polymer P according to the invention are characterized in that
A, C, B are selected from the group comprising 1,3-butadiene, styrene and isoprene;
A is 1,3-butadiene, styrene or isoprene;
B is 1,3-butadiene, styrene or isoprene;
C is 1,3-butadiene, styrene or isoprene;
A contains an OH group;
A contains an $NH_2$ group;
B contains an OH group;
B contains an $NH_2$ group;
C contains an OH group;
C contains an $NH_2$ group;
A is hydroxy- or amine-functionalized styrene and the phenyl ring of the functionalized styrene comprises an OH or $NH_2$ group in the ortho, meta or para position;
B is hydroxy- or amine-functionalized styrene and the phenyl ring of the functionalized styrene comprises an OH or $NH_2$ group in the ortho, meta or para position;
C is hydroxy- or amine-functionalized styrene and the phenyl ring of the functionalized styrene is an OH or $NH_2$ group in the ortho, meta or para position;
R is a radical of silicon (Si);
the star polymer P has a polydispersity $\overline{M}_w/\overline{M}_n \leq 2$;
the star polymer P has a polydispersity $\overline{M}_w/\overline{M}_n \leq 1.6$, preferably $\overline{M}_w/\overline{M}_n \leq 1.2$ and in particular $\overline{M}_w/\overline{M}_n \leq 1.1$;
the star polymer P has a molar mass $M_w$ where 2000 g·mol$^{-1} \leq M_w \leq$ 200 000 g·mol$^{-1}$; and/or
the star polymer P has a molar mass $M_w$ where 2000 g·mol$^{-1} \leq M_w \leq$ 20 000 g·mol$^{-1}$, 15000 g·mol$^{-1} \leq M_w \leq$ 25 000 g·mol$^{-1}$, 20 000 g·mol$^{-1} \leq M_w \leq$ 30 000 g·mol$^{-1}$, 25 000 g·mol$^{-1} \leq M_w \leq$ 35 000 g·mol$^{-1}$, 30 000 g·mol$^{-1} \leq M_w \leq$ 50 000 g·mol$^{-1}$, 40 000 g·mol$^{-1} \leq M_w \leq$ 60 000 g·mol$^{-1}$, 50 000 g·mol$^{-1} \leq M_w \leq$ 70 000 g·mol$^{-1}$, 60 000 g·mol$^{-1} \leq M_w \leq$ 80 000 g·mol$^{-1}$, 70 000 g·mol$^{-1} \leq M_w \leq$ 90 000 g·mol$^{-1}$, 80 000 g·mol$^{-1} \leq M_w \leq$ 100 000 g·mol$^{-1}$, 90 000 g·mol$^{-1} \leq M_w \leq$ 130 000 g·mol$^{-1}$, 110 000 g·mol$^{-1} \leq M_w \leq$ 150 000 g·mol$^{-1}$, 130 000 g·mol$^{-1} \leq M_w \leq$ 170 000 g·mol$^{-1}$ or 150 000 g·mol$^{-1} \leq M_w \leq$ 200 000 g·mol$^{-1}$.

In the present invention it is preferable to employ a core which is m-fold functionalized with hydroxyl, carboxy, amino, isocyanate, epoxy or vinyl groups. The symbol "R" represents a radical of the m-fold functionalized core K without the functional groups/of the star polymer P without arms. The term "radical R of a telechelic oligomer" analogously relates to an oligomer without the two terminal functional groups.

The process according to the invention comprises initially synthesizing the arms by the established prior art method of "living" anionic polymerization which is illustrated with reference to polystyrene in scheme A.

Scheme A

Initiation:

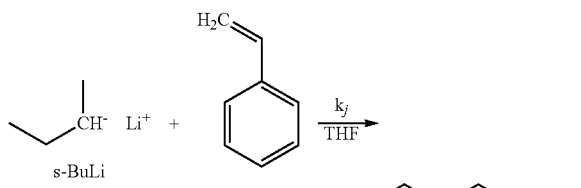

Polymerization

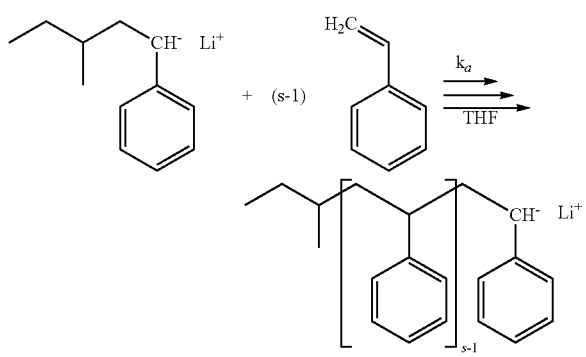

The anionic polymerization shown in Scheme A is effected without chain termination and chain transfer reactions. Assuming rapid initiation the polymerization rate is given by the following relationship $$R_P = -\frac{d[M]}{dt} = k_P \cdot [P^*] \cdot [M] \quad \text{(I)}$$

wherein [M] is the monomer concentration, $k_P$ is the propagation rate and [P*] is the concentration of the active chain ends/carbanions. In the absence of termination reactions [P*] is constant and the product $k_P \cdot [P^*] = k_a$ can therefore be viewed as a first order rate constant. Through integration of the relationship (I) it follows that $$\ln \frac{[M]_0}{[M]} = -\ln(1 - x_P) = k_P \cdot [P^*] \cdot t = k_a \cdot t \quad \text{(II)}$$

where the monomer conversion rate $x_P = ([M]_0 - [M])/[M]_0$. The average degree of polymerization is given by $$\overline{DP_n} = \frac{\text{Monomer consumption}}{\text{Number of chains}} = \frac{[M]_0 - [M]}{[P]} = \frac{[M]_0}{[P]} \cdot x_P \quad \text{(III)}$$

wherein [P] is the number of all polymer chains. In the absence of termination reactions [P]=[P*]=f·[I]₀, wherein [I]₀ is the initial initiator concentration and f is the initiator efficiency. The absence of termination and chain transfer reactions has the result that the average molecular weight $M_n$ is determined by monomer consumption and initiator concentration [I]₀ and the polymer chains grow at a constant rate. The linear chain growth relative to monomer consumption results in a narrow Poisson distribution for chain length, with polydispersity PDI given to a good approximation by the relationship $$PDI = \frac{\overline{M_w}}{\overline{M_n}} \approx 1 + \frac{1}{\overline{DP_n}} \quad \text{(IV)}$$

An important aspect of the process according to the invention is that the reactive functionalities for the coupling of "living" polymer arms are spaced apart from one another by methylene groups. This reduces steric hindrance, which is thought to be a prerequisite for quantitative and rapid coupling. It has surprisingly been found that despite delocalization of the negative charge at the chain end and considerable steric hindrance from the phenyl ring the coupling of polystyryllithium anions proceeds quickly (<2 h), stoichiometrically and quantitatively with high yield (>93%) if a core having monochlorodimethylsilyl groups bonded via alkyl spacers, for example tetra[3-(dimethylchlorosilyl)propyl]silane, is added as a stock solution in tetrahydrofuran (THF). Surprisingly, the synthesis of the star polymers by the process according to the invention is complete very quickly within a few minutes up to not more than one hour. The process according to the invention is moreover highly efficient and freely scalable to industrial reaction volumes of a few m³ up to 300 m³. After completion of the synthesis the reaction mixture contains virtually no starting materials in addition to the desired star polymers. The process according to the invention is preferably performed in a reaction mixture containing THF (tetrahydrofuran) as the primary or sole solvent. A very high reaction rate/polymerization rate is achieved with the solvent THF.

It is preferable to employ a core K having m coupling groups each containing more than 3 methylene groups (n≥3). A number of methylene groups per coupling group of 3 or more (n≥3) brings about a jump in the reaction rate in step (g) in the conjugation of the linear polymers/arms with the core K. The advantageous reaction kinetics of cores K having more than 3 methylene groups (n≥3) per coupling group are presumably based on steric effects. The process according to the invention can be carried out in screwtop bottles and is easily scalable to industrial volumes and processes with a protective gas atmosphere. The invention further allows quantitative coupling of simple or functionalized polystyryllithium species without by-products. Coupling reagents having monochlorodimethylsilyl groups bonded via alkyl spacers can be synthesized quickly, easily and quantitatively. No by-products are formed in the process according to the invention. There is therefore no need for costly and inconvenient purification by fractionation.

The invention allows economic production of star polymers having configurable architecture, low polydispersity $\overline{M_w}/\overline{M_n} \leq 1.1$ and high molecular weight $M_w$ of up to 200 000 g mol⁻¹. The precisely controllable synthesis process makes it possible to systematically determine structure-activity relationships and to effect targeted adaptation of the mechanical properties of the star polymer for a wide range of products and applications. The star polymers according to the invention have novel properties and complement known thermoplastic elastomers (TPE) with star architecture, such as STYROLUX® and SOLPRENE®.

The invention is more particularly elucidated hereinbelow with reference to examples and figures.

Example 1: Synthesis of the Core K

Scheme 1 is a generic scheme showing the synthesis of a core for the star polymer according to the invention

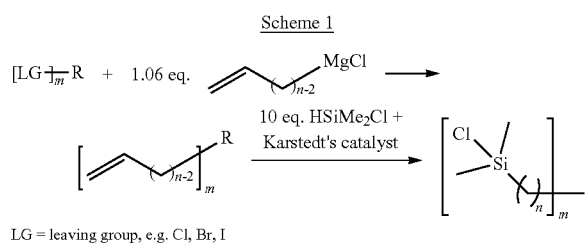

LG = leaving group, e.g. Cl, Br, I

Example 1a: Synthesis of Tetraallylsilane

SiCl$_4$ (3.4 g, 20 mmol) dissolved in anhydrous diethyl ether (5 ml) was added dropwise to a stirred solution of allylmagnesium chloride (1 M in diethyl ether) (71.5 g, 84 mmol). The reaction solution was then stirred at 65° C. for 3.5 hours. The excess allylmagnesium chloride was quenched with a saturated solution of aqueous NH$_4$Cl. The precipitate (MgCl$_2$) was filtered off and the filtrate concentrated under reduced pressure. The residue was distilled and tetraallylsilane was obtained as a colorless liquid in a yield of 3.5 g (91%).

$^1$H-NMR (400 MHz, chloroform-d$_1$) δ=5.90-5.68 (m, 4H, H$_b$), 5.04-4.75 (m, 8H, H$_a$), 1.61 (d, J=8.0 Hz, 8H, H$_c$).

Example 1b: Synthesis of triallyl(methyl)silane

Methyltrichlorosilane (6.5 g, 43.5 mmol) dissolved in anhydrous diethyl ether (5 ml) was added dropwise to a stirred solution of allylmagnesium chloride (1 M in diethyl ether) (118.4 g, 139 mmol). The reaction solution was then stirred at 65° C. for 3.5 hours. The excess allylmagnesium chloride was quenched with a saturated solution of aqueous NH$_4$Cl. The precipitate (MgCl$_2$) was filtered off and the filtrate concentrated under reduced pressure. The residue was distilled and triallyl(methyl)silane was obtained as a colorless liquid in a yield of 6.5 g (90%).

$^1$H-NMR (400 MHz, chloroform-d) δ=5.89-5.64 (m, 3H, H$_b$), 4.96-4.69 (m, 6H, H$_a$), 1.58 (d, J=8.1 Hz, 6H, H$_c$), 0.01 (s, 3H, H$_d$).

Example 1c: Synthesis of tetra[3-(dimethylchlorosilyl)propyl]silane

A solution of tetraallylsilane (7.0 g, 36.4 mmol) in anhydrous n-hexane (15 ml) was added dropwise to a stirred solution of dimethylchlorosilane (41.10 g, 473 mmol) and 5 drops of Karstedt's catalyst (2% in xylene) in anhydrous n-hexane (75 ml). The conversion of the reaction was monitored by $^1$H-NMR spectroscopy based on the disappearance of the signals of the allyl protons (δH=5.90-5.68 and 5.04-4.75 ppm). At a conversion of 100% the reaction mixture was concentrated under reduced pressure and the residue was fractionated under vacuum to obtain tetra[3-(dimethylchlorosilyl)propyl]silane as a colorless oil in a yield of 16.55 g (80%).

$^1$H-NMR (400 MHz, chloroform-d$_1$) δ=1.54-1.38 (m, 8H, H$_c$), 0.92 (t, 8H, H$_b$), 0.69-0.59 (m, 8H, H$_d$), 0.43 (s, 24H, H$_a$).
$^{13}$C-NMR (101 MHz, chloroform-d$_1$) δ=23.75 (C$_b$), 17.93 (C$_c$), 16.76 (C$_d$), 1.99 (C$_a$). Scheme 2 shows the synthesis of tetra[3-(dimethylchlorosilyl)propyl]silane.

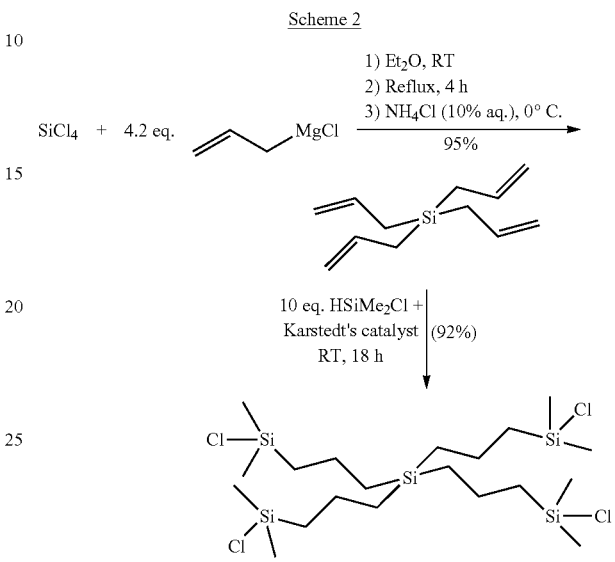

Example 1d: Synthesis of [(methylsilanetriyl)tris(propane-3,1-diyl)]tris(chlorodimethylsilane)

A solution of triallyl(methyl)silane (1.75 g, 10.5 mmol) in anhydrous n-hexane (5 ml) was added dropwise to a stirred solution of dimethylchlorosilane (5.94 g, 63 mmol) and 5 drops of Karstedt's catalyst (2% in xylene) in anhydrous n-hexane (15 ml). The conversion of the reaction was monitored by $^1$H-NMR spectroscopy based on the disappearance of the signals of the allyl protons (δH=5.89-5.64 and 4.96-4.69 ppm). At a conversion of 100% the reaction mixture was concentrated under reduced pressure and the residue was fractionated under vacuum to obtain [(methylsilanetriyl)tris(propane-3,1-diyl)]tris(chlordimethylsilane) as a colorless oil in a yield of 3.82 g (81%). 1H-NMR (400 MHz, chloroform-d) δ=1.49-1.38 (m, 6H, H$_c$), 0.93-0.85 (m, 6H, H$_b$), 0.65-0.56 (m, 6H, H$_d$), 0.40 (s, 18H, H$_a$), −0.04 (s, 3H, H$_e$). $^{13}$C NMR (101 MHz, chloroform-d) δ 23.65, H$_b$, 18.12, H$_d$, 17.85, H$_c$, 1.98, H$_a$, −4.96, H$_e$.

Example 1e: Synthesis of bis[3-(chlorodimethylsilyl)propyl]dimethylsilane

A solution of diallyldimethylsilane (1.5 g, 10.7 mmol) in anhydrous n-hexane (5 ml) was added dropwise to a stirred solution of dimethylchlorosilane (2.52 g, 27 mmol) and 5 drops of Karstedt's catalyst (2% in xylene) in anhydrous n-hexane (15 ml). The conversion of the reaction was monitored by $^1$H-NMR spectroscopy based on the disappearance of the signals of the allyl protons (δH=5.89-5.64 and 4.96-4.69 ppm). At a conversion of 100% the reaction solution was concentrated under reduced pressure and the residue was fractionated under vacuum to obtain bis[3-(chlordimethylsilyl)propyl]dimethylsilane as a colorless oil in a yield of 2.73 g (78%).

$^1$H-NMR (400 MHz, benzene-$d_6$) δ=1.58-1.42 (m, 4H, $H_c$), 0.83-0.70 (m, 4H, $H_b$), 0.63-0.51 (m, 4H, $H_d$), 0.25 (s, 12H, $H_a$), −0.00 (s, 6H, $H_e$).

$^{13}$C NMR (101 MHz, benzene-$d_6$) δ=23.57, 19.58, 18.11, 1.76, −3.21.

Example 1f: Synthesis of 1,3,5-tri[3-(dimethylchlorosilyl)propyl]triazine

Scheme 3 shows the synthesis of a core of the type 1,3,5-tri[3-(dimethylchlorosilyl)propyl]triazine.

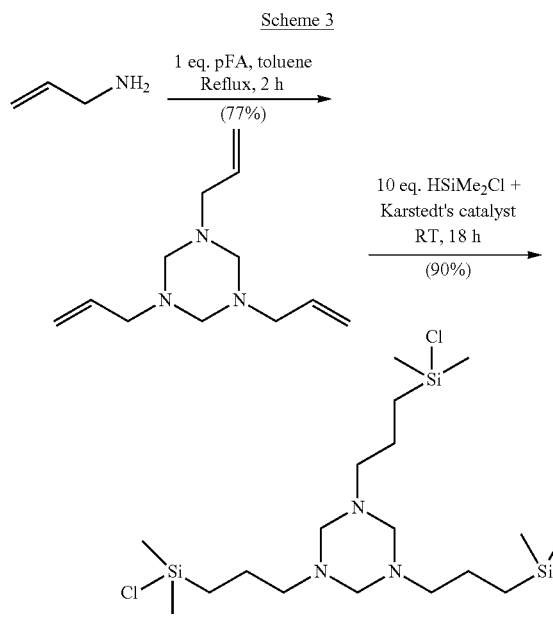

Example 1g: Synthesis of Telechelically Functionalized Polystyrene

Scheme 4 shows the synthesis of a core composed of telechelically functionalized polystyrene. The synthesis according to scheme 4 is directly employable for preparing cores having a backbone composed of polyacrylate or polybutadiene and copolymers of styrene, acrylate and/or 1,3-butadiene monomers.

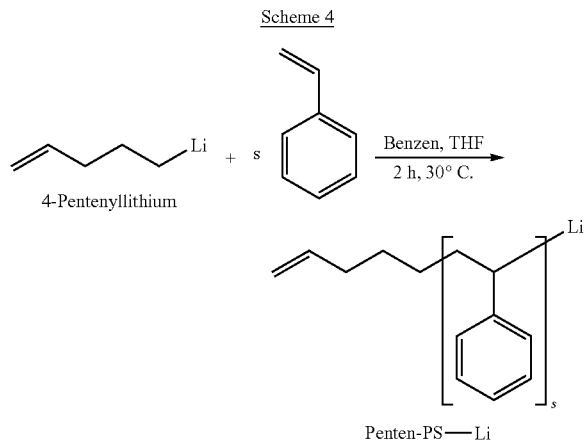

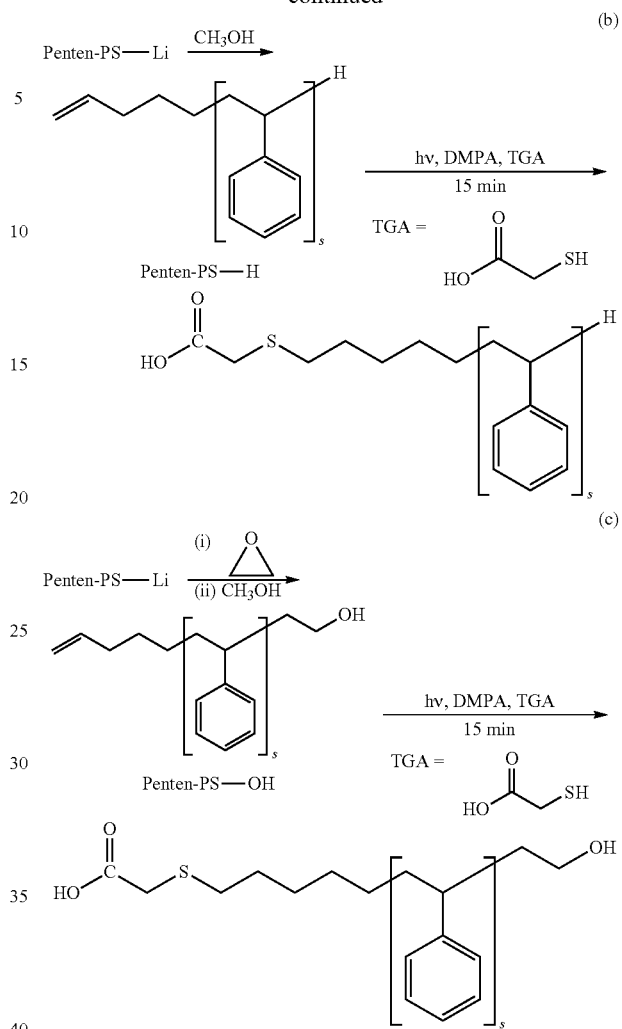

Example 2: Synthesis of Star Polymers

Example 2a: Polymerization of Star Polymers

All polymerizations were carried out at room temperature in a 100 ml Schlenk flask sealed with a TEFLON® stopper in an argon-filled glovebox (MBraun UNIlab™, <0.1 ppm $O_2$, <0.1 ppm $H_2O$). Cyclohexane was purified by stirring over diphenylhexyllithium (adduct of sec-butyllithium and 1,1-diphenylethylene) and transferred to the Schlenk flask under vacuum. Monomers, such as 1,3-butadiene, isoprene, and styrene, that had been previously dried by stirring over $CaH_2$ in a flask for 24 h were distilled into the Schlenk flask. The monomer/solvent mixture (20% by weight) was initiated with sec-butyllithium (1.3 M in cyclohexane/hexane in a 92/8 ratio) via a 1 ml syringe. The solution was stirred overnight to ensure complete conversion of the monomer. The next day, the core/the coupling reagent was carefully weighed out (equimolar amount) and added dropwise to the living polymer as a stock solution in THF having a concentration of 100 eq THF per 1 eq Li. The coupling reaction was carried out until decolorization and was terminated by addition of 1 ml of methanol (degassed with argon over 1 h) with a syringe. To precipitate the polymer the mixture was added dropwise to a 10-fold excess of isopropyl alcohol with a little butylhydroxytoluene (3,5-di-tert-butyl-4-hydroxytoluene). The precipitate was separated off by filtration and dried under reduced pressure.

Example 2b: Polymerization of a Star Polymer with Poly (Isoprene-Co-Styrene) Arms The polymerization was carried out at room temperature in a 100 ml Schlenk flask sealed with a TEFLON® stopper in an argon-filled glovebox (MBraun UNILAB™, <0.1 ppm $O_2$, <0.1 ppm $H_2O$). Cyclohexane was purified by stirring over diphenylhexyllithium (adduct of sec-butyllithium and 1,1-diphenylethylene) and transferred to the Schlenk flask under vacuum. Isoprene and styrene that had been previously dried by stirring over $CaH_2$ in a flask for 24 h were distilled into the Schlenk flask. The monomer/solvent mixture (20% by weight) was initiated with sec-butyllithium (1.3 M in cyclohexane/hexane in a 92/8 ratio) via a 1 ml syringe. The solution was stirred overnight to ensure complete conversion of the monomers. The next day, the core/the coupling reagent was carefully weighed out (equimolar amount) and added dropwise to the living polymer as a stock solution in THF having a concentration of 100 eq THF per 1 eq Li. The coupling reaction was carried out until decolorization and was terminated by addition of 1 ml of methanol (degassed with argon over 1 h) with a syringe. To precipitate the polymer the mixture was added dropwise to a 10-fold excess of isopropyl alcohol with a little butylhydroxytoluene (3,5-di-tert-butyl-4-hydroxytoluene). The precipitate was separated off by filtration and dried under reduced pressure.

Tables 1-4 show the results of GPC/SEC measurements on star polymers and the arms comprised therein. The table column headings are as follows:

Arm $M_w^{calc}$: molar weight of the arms calculated on the basis of the molar ratios of the initiator employed in the "living" anionic polymerization and the monomers;

Arm $M_w^{exp}$: molar weight of the arms after complete monomer conversion in the "living" anionic polymerization, determined by GPC;

f: ratio of the molar weights determined by GPC of the star polymer and the arms, which corresponds to the number of arms per star polymer and is also referred to as functionality in the context of the invention;

$\overline{M}_w/\overline{M}_n$: polydispersity of the star polymer determined by GPC;

The molar weights of the arms and of the star polymer were in each case determined by averaging over three GPC measurements (triple injection). This was done using the RI signal (refractive index detector), an online viscometer and THF as eluent. The GPC system was calibrated using polystyrene standards from Polymer Standard Service GmbH prior to the measurements.

TABLE 1

GPC results for star polymers having three and four polyisoprene arms and a tetra[3-(dimethylchlorosilyl)propyl]silane core

| Sample No. | Arm $M_w^{calc}$ [kg·mol$^{-1}$] | Arm $M_w^{exp}$ [kg·mol$^{-1}$] | f | $\overline{M}_w/\overline{M}_n$ |
|---|---|---|---|---|
| 1 | 3 | 4.1 ± 0.1 | — | 1.08 ± 0.01 |
| 2 | 12 | 16.2 ± 0.4 | 4.0 ± 0.1 | 1.20 ± 0.02 |

TABLE 2

GPC results for star polymers having four poly(isoprene-co-styrene) arms and a tetra[3-(dimethylchlorosilyl)propyl]silane core; the molar ratio of isoprene and styrene monomers in the arms is 1:1

| Sample No. | Arm $M_w^{calc}$ [kg·mol$^{-1}$] | Arm $M_w^{exp}$ [kg·mol$^{-1}$] | f | $\overline{M}_w/\overline{M}_n$ |
|---|---|---|---|---|
| 3 | 10 | 12.2 ± 0.1 | — | 1.20 ± 0.02 |
| 4 | 40 | 50 ± 1 | 3.98 ± 0.07 | 1.19 ± 0.01 |
| 5 | 15 | 20.3 ± 0.08 | — | 1.14 ± 0.01 |
| 6 | 60 | 75 ± 1 | 3.68 ± 0.06 | 1.15 ± 0.02 |
| 7 | 30 | 31.6 ± 0.3 | — | 1.10 ± 0.01 |
| 8 | 120 | 119 ± 2 | 3.92 ± 0.05 | 1.20 ± 0.03 |

TABLE 3

GPC results for star polymers having three poly(isoprene) arms and a [(methylsilanetriyl)tris(propane-3,1-diyl)]tris(chlorodimethylsilane) core

| Sample No. | Arm $M_w^{calc}$ [kg·mol$^{-1}$] | Arm $M_w^{exp}$ [kg·mol$^{-1}$] | f | $\overline{M}_w/\overline{M}_n$ |
|---|---|---|---|---|
| 9 | 9 | 9.8 ± 0.12 | — | 1.09 ± 0.01 |
| 10 | 27 | 28.3 ± 0.16 | 2.88 ± 0.04 | 1.18 ± 0.01 |

TABLE 4

GPC results for star polymers having two poly(isoprene) arms and a bis[3-(chlorodimethylsilyl)propyl]dimethylsilane core

| Sample No. | Reaction time [h] | Conc. [mol %] | Arm $M_n^{calc}$ [kg·mol$^{-1}$] | Arm $M_n^{exp}$ [kg·mol$^{-1}$] | f | $\overline{M}_w/\overline{M}_n$ | Yield [%] |
|---|---|---|---|---|---|---|---|
| 11 | 12 | 20 | 9 | 8.8 | — | 1.03 | 95 |
| 12 | titration | 10 | 18 | 16.0 | 1.82 | 1.05 | 94 |
| 13 | titration | 20 | 18 | 16.3 | 1.84 | 1.05 | 96 |
| 14 | titration | 30 | 18 | 15.8 | 1.79 | 1.05 | 94 |

Figure 2:
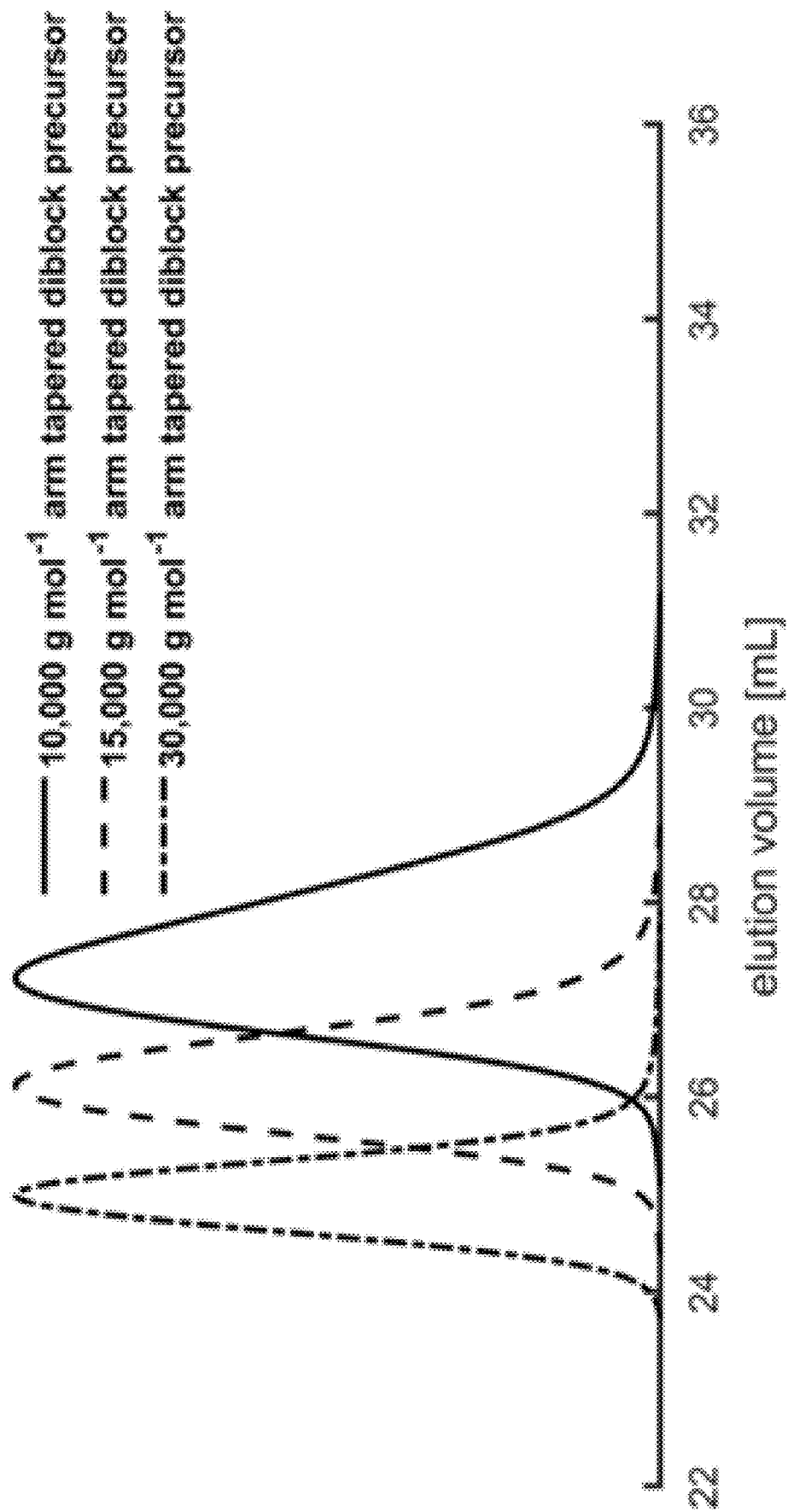
FIG. 2 is a graphical illustration of GPC elugrams of an exemplary poly(isoprene-co-styrene) arms and four-armed polymer produced therewith.
Figure 3:
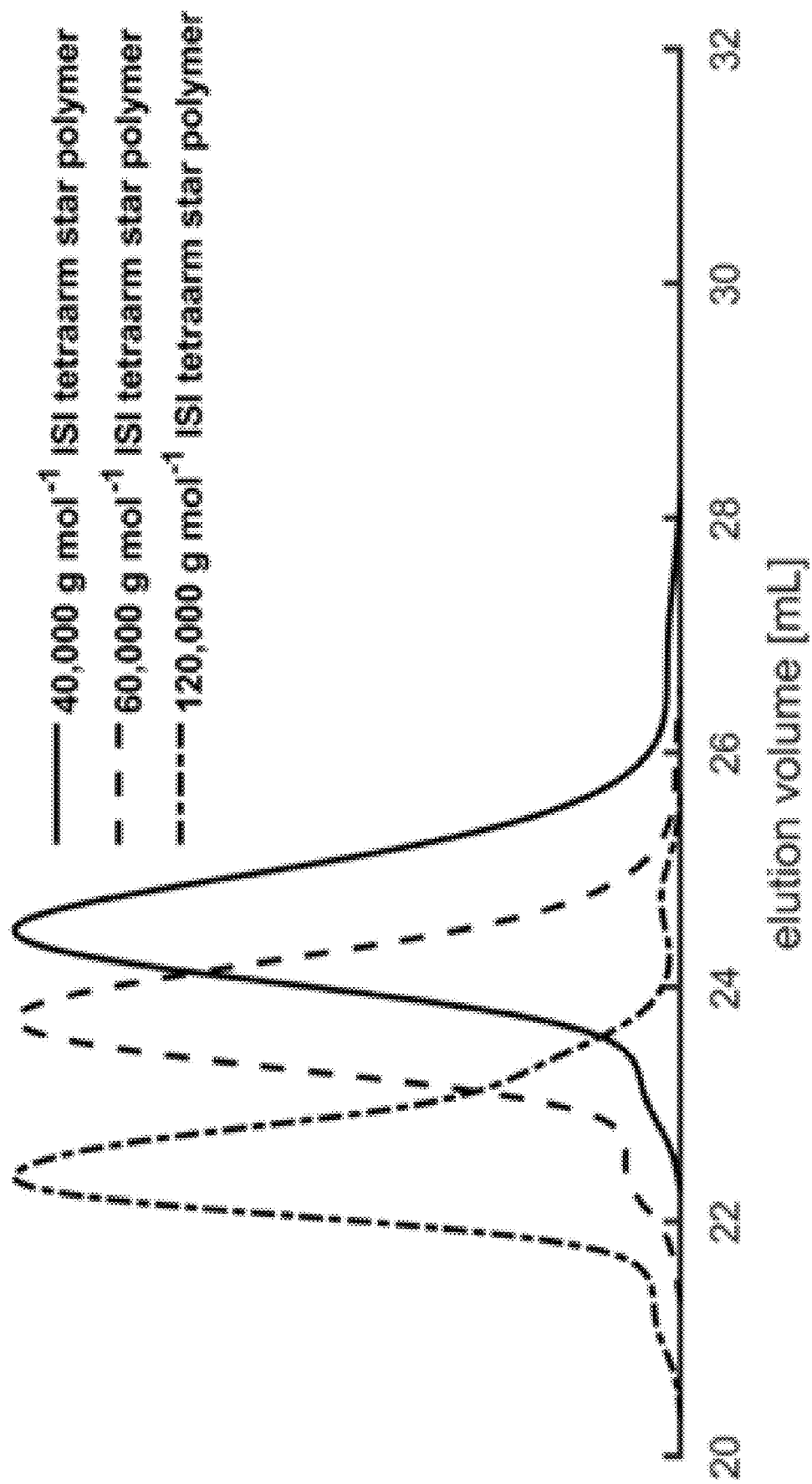
FIG. 3 is a graphical illustration of GPC elugrams of an exemplary star polymer having four poly(isoprene-co-styrene) arms.
Figure 4:
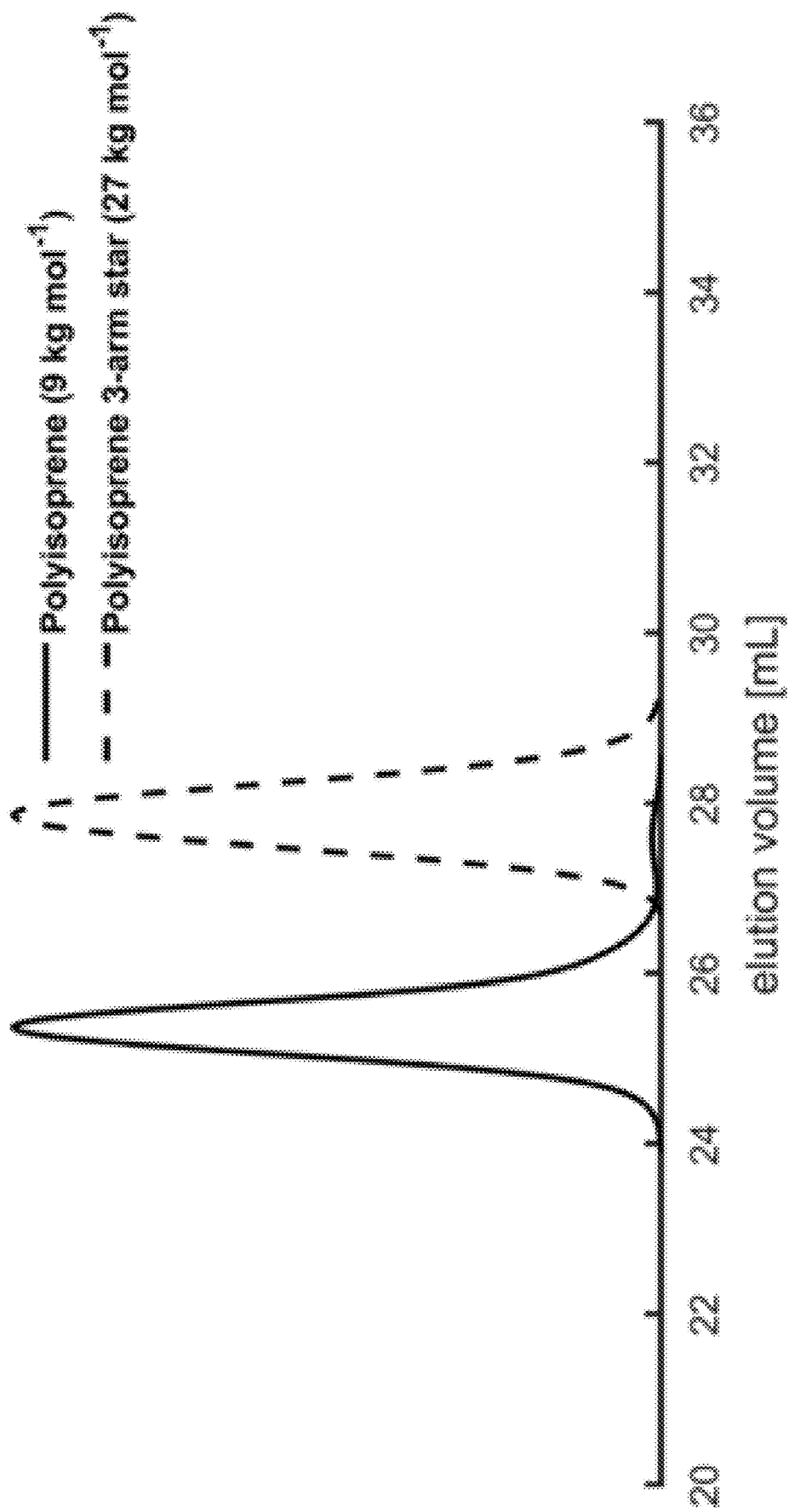
FIG. 4 is a graphical illustration of GPC elugrams of exemplary poly(isoprene) arms and a three-armed star polymer produced therewith.
Figure 5:
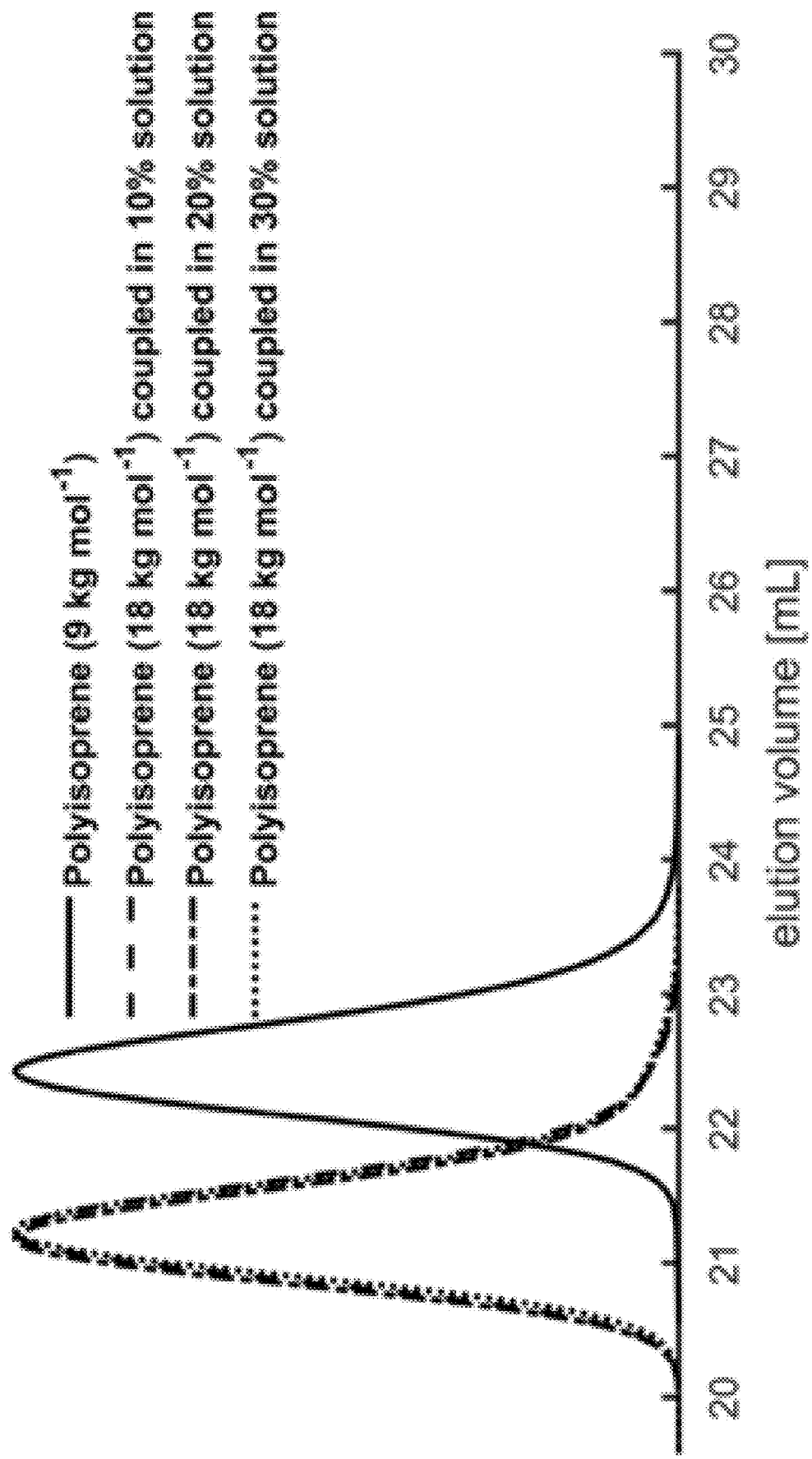
FIG. 5 is a graphical illustration of GPC elugrams of exemplary poly(isoprene) arms and two-armed star polymer produced therewith.

FIG. 1 to 5 show GPC elugrams of arms synthesized by "living" anionic polymerization and star polymers produced therewith. Specifically:

FIG. 1 shows GPC elugrams of poly(styrene) arms and a four-armed star polymer produced therewith having a tetra [3-(dimethylchlorosilyl) propylsilane core;

FIG. 2 shows GPC elugrams of poly(isoprene-co-styrene) arms and a four-armed star polymer produced therewith having a tetra[3-(dimethylchlorosilyl)propyl]silane core;

FIG. 3 shows GPC elugrams of star polymers having four poly(isoprene-co-styrene) arms and a tetra[3-(dimethylchlorosilyl)propyl]silane core;

FIG. 4 shows GPC elugrams of poly(isoprene) arms and a three-armed star polymer produced therewith having a [(methylsilanetriyl)tris(propane-3,1-diyl)]tris(chlorodimethylsilane) core;

FIG. 5 shows GPC elugrams of poly(isoprene) arms and a two-armed star polymer produced therewith having a bis[3-(chlorodimethylsilyl)propyl]dimethylsilane core.

Figure 6:
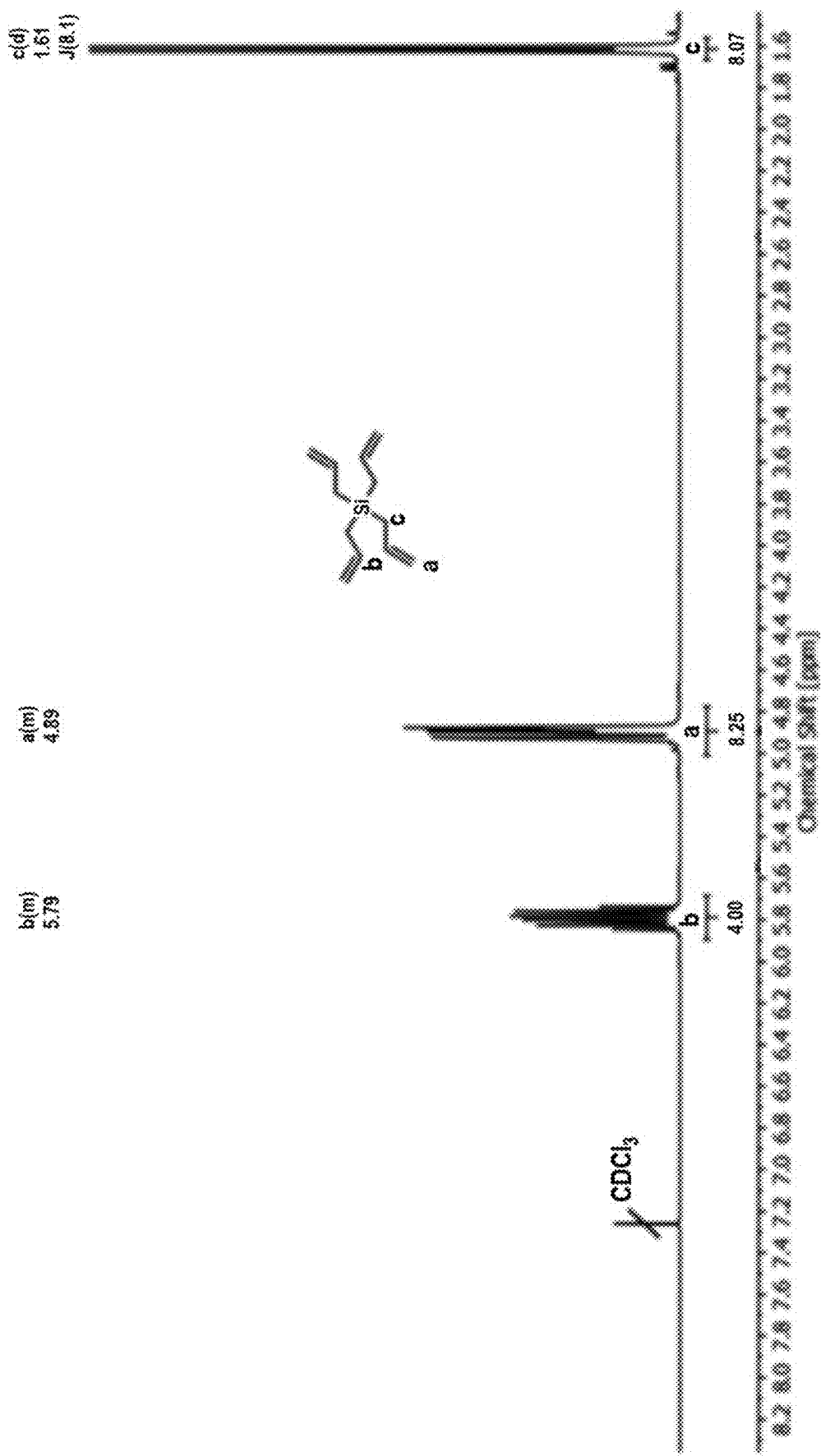
FIG. 6 is a graphical illustration of a $^1$H-NMR spectrum of an exemplary tetraallylsilane precursor.
Figure 7:
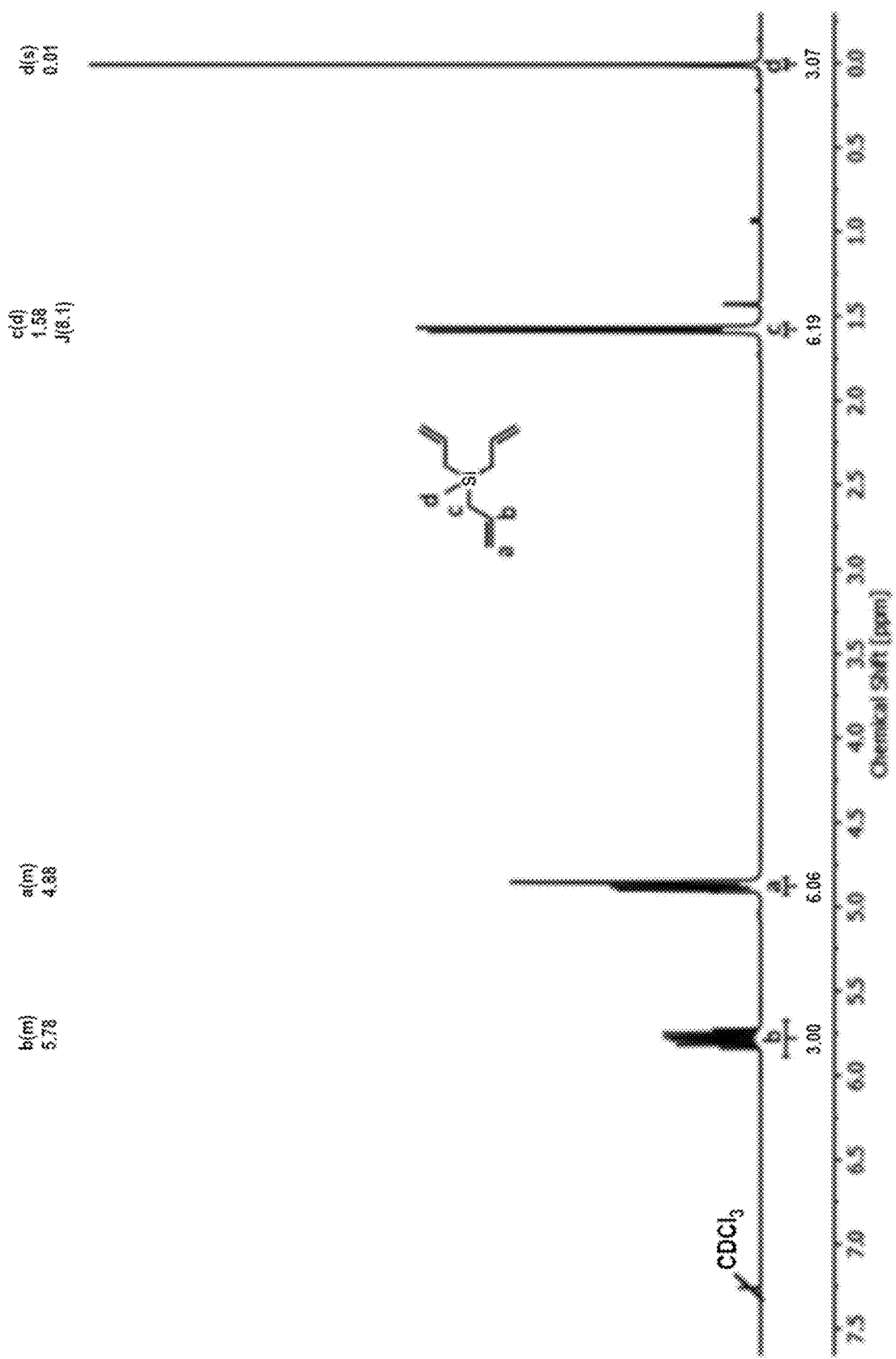
FIG. 7 is a graphical illustration of a $^1$H-NMR spectrum of an exemplary triallyl(methyl) silane precursor.
Figure 8:
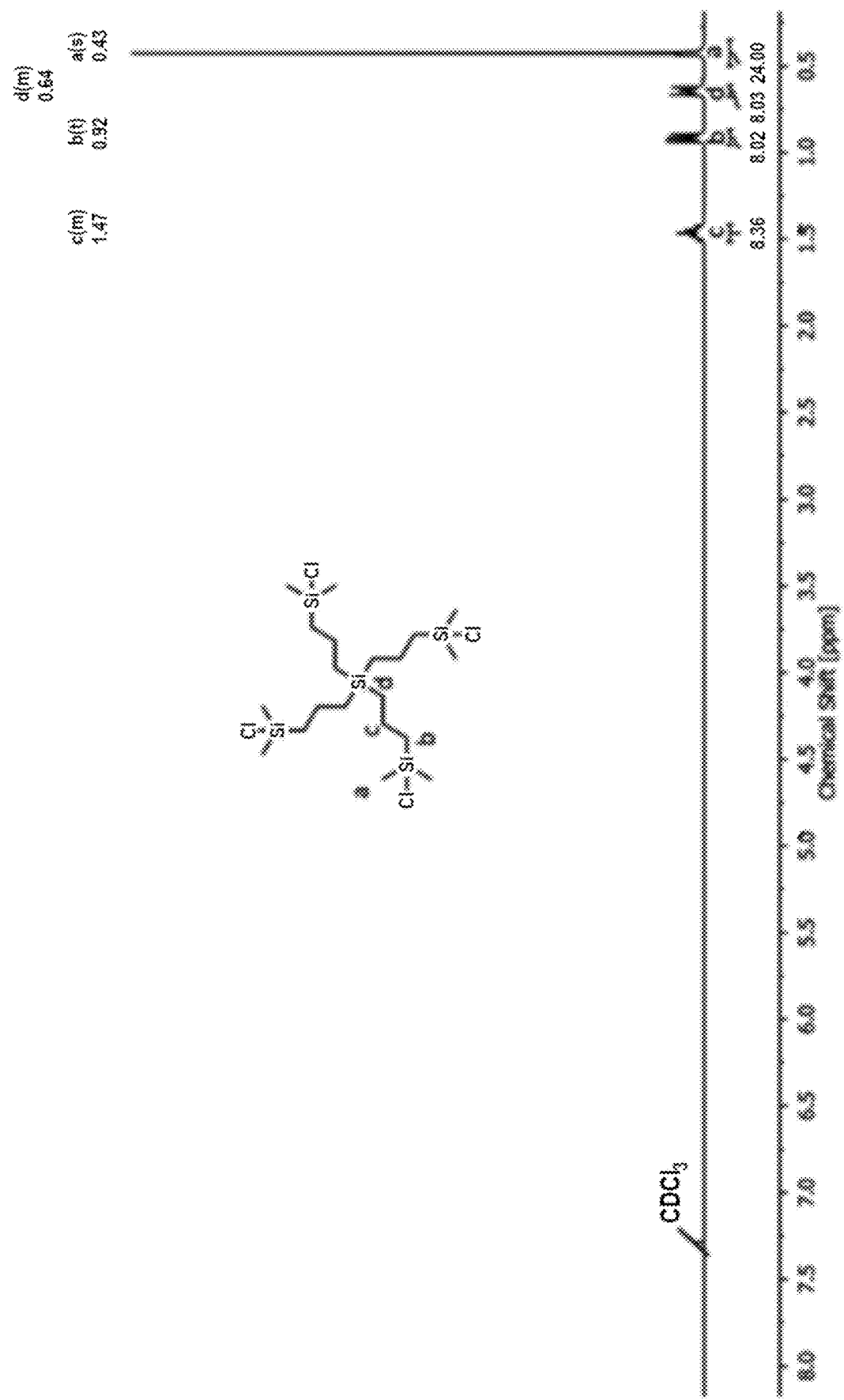
FIG. 8 is a graphical illustration of a $^1$H-NMR spectrum of an exemplary tetra[3-(dimethylchlorosilyl)propyl]silane core.
Figure 9:
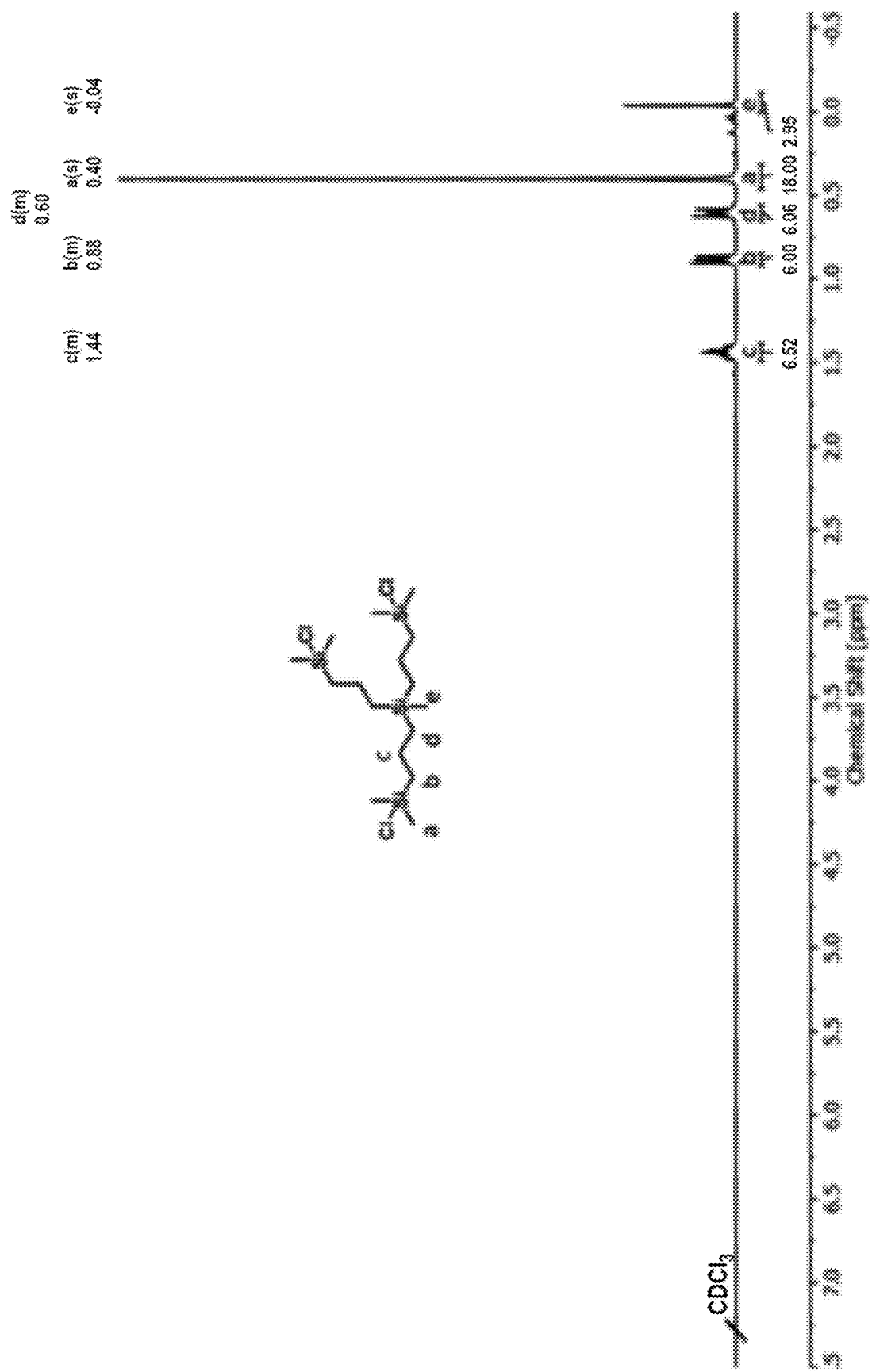
FIG. 9 is a graphical illustration of a $^1$H-NMR spectrum of an exemplary [(methylsilanetriyl)tris(propane-3,1-diyl)] tris(chlorodimethylsilane) core.
Figure 10:
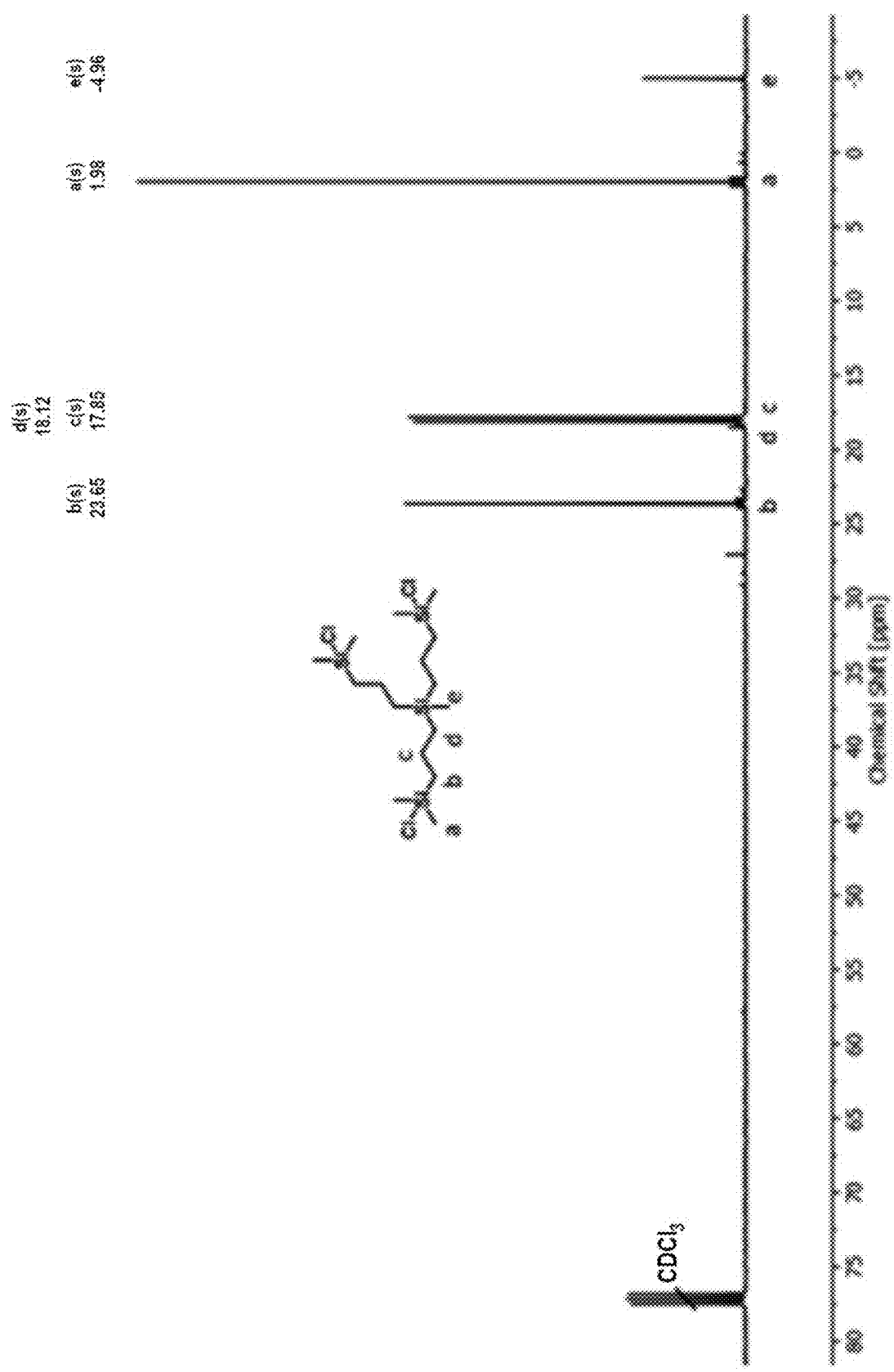
FIG. 10 is a graphical illustration of a $^{13}$C-NMR spectrum of an exemplary [(methylsilanetriyl)tris(propane-3,1-diyl)] tris(chlorodimethylsilane) core.
Figure 11:
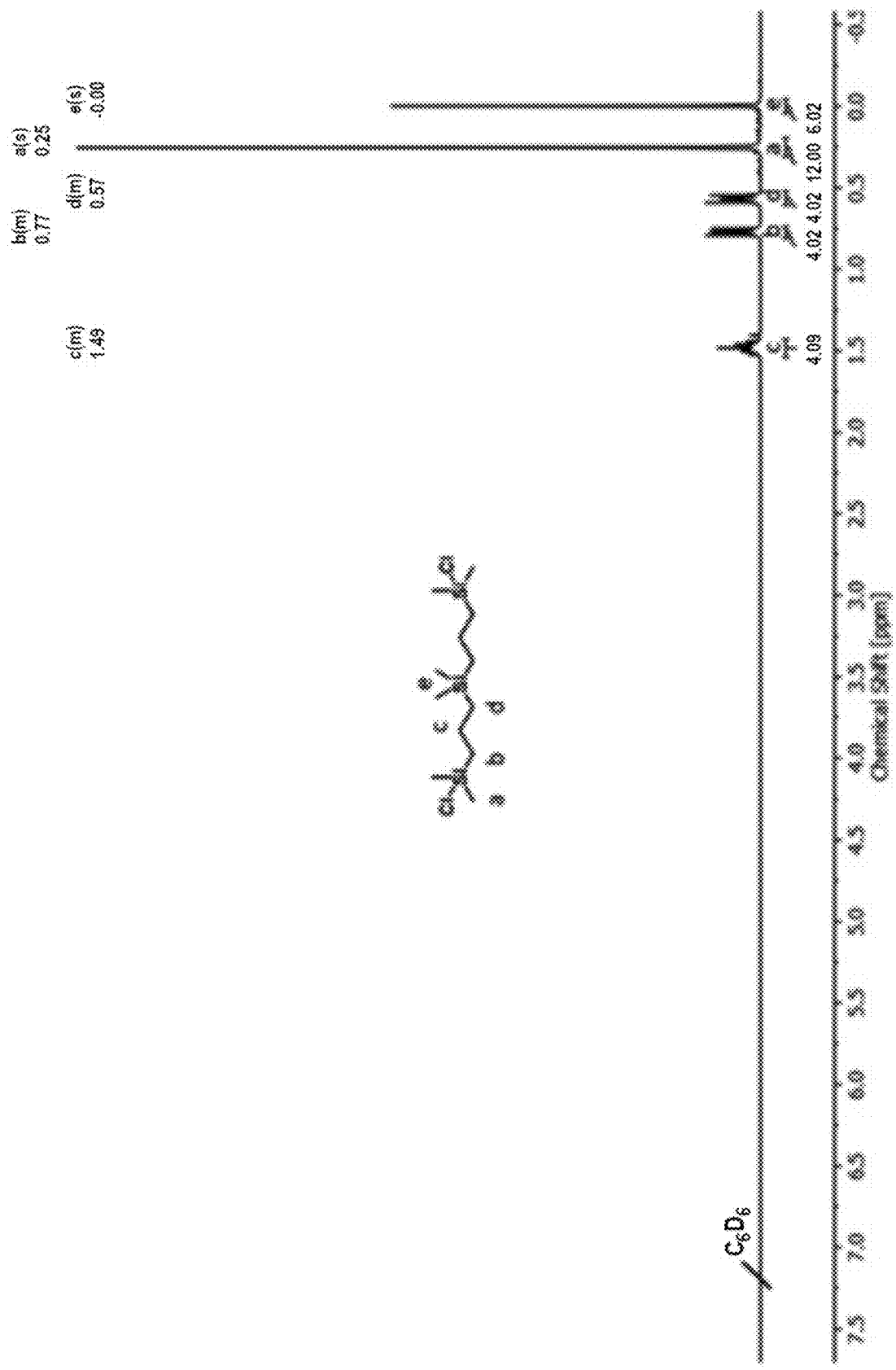
FIG. 11 is a graphical illustration of a $^1$H-NMR spectrum of an exemplary bis[3-(chlorodimethylsilyl)propyl] dimethylsilane core.
Figure 12:
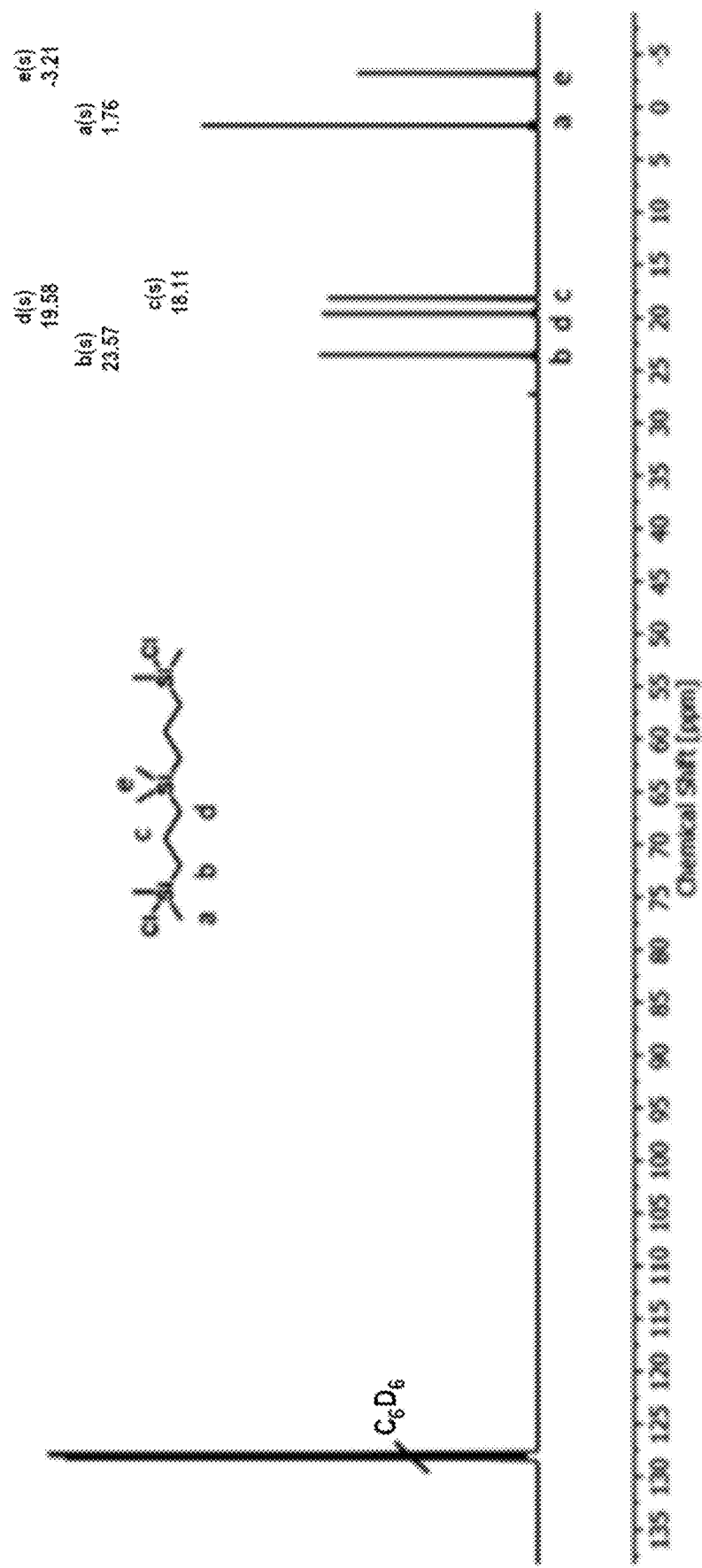
FIG. 12 is a graphical illustration of a $^{13}$C-NMR spectrum of an exemplary bis[3-(chlorodimethylsilyl)propyl] dimethylsilane core.
Figure 13:
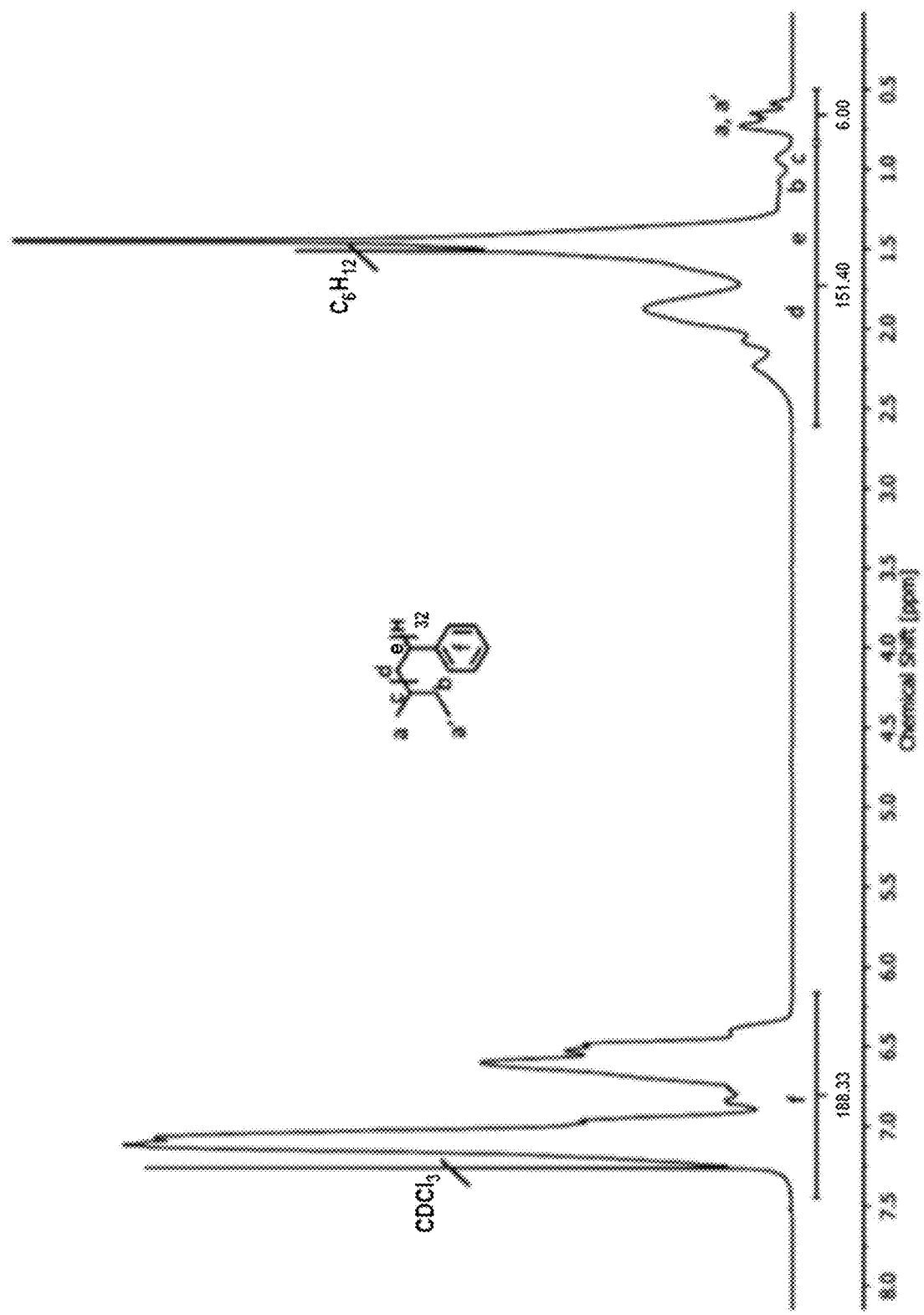
FIG. 13 is a graphical illustration of a $^1$H-NMR spectrum of an exemplary polystyrene arm.
Figure 14:
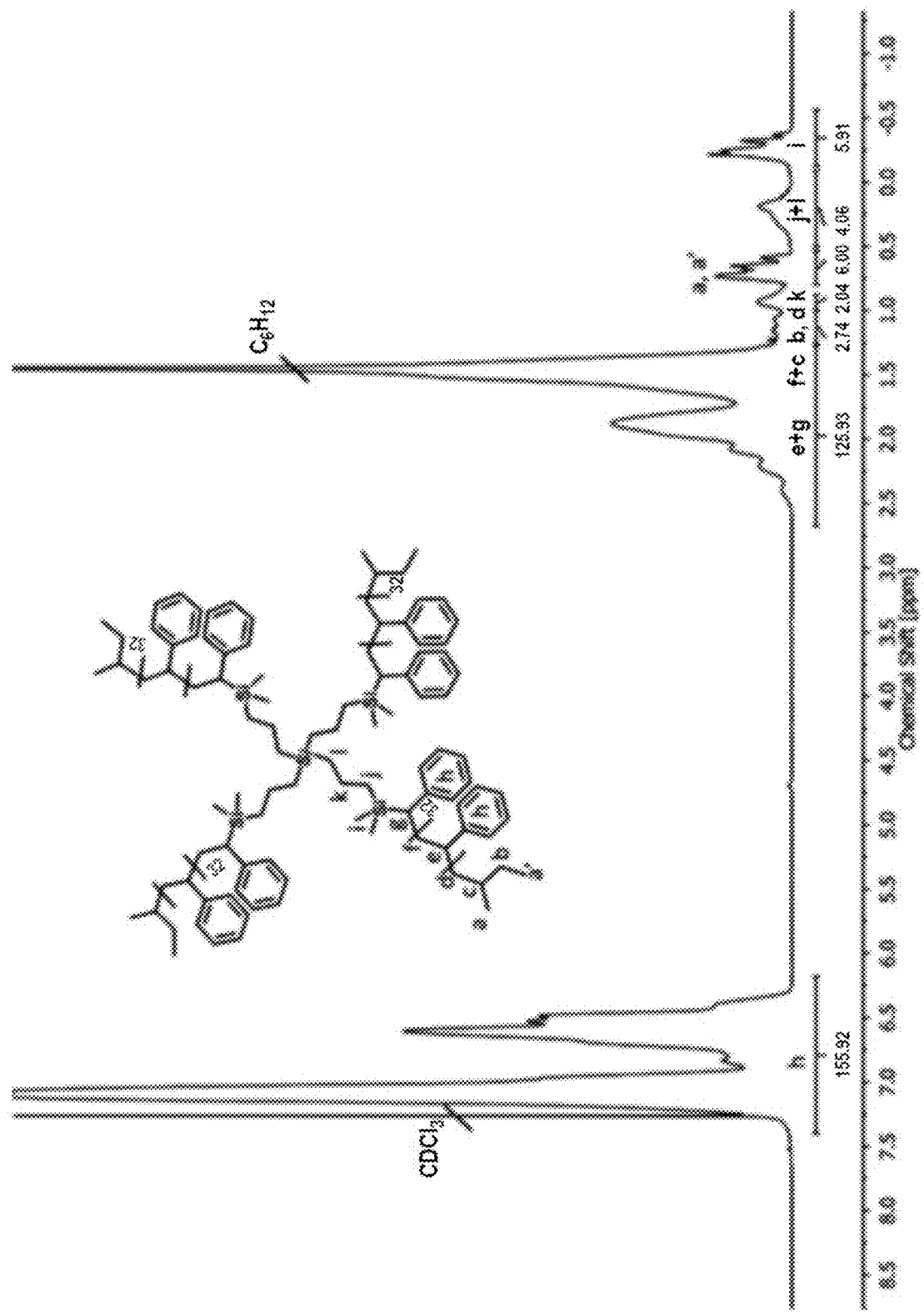
FIG. 14 is a graphical illustration of a $^1$H-NMR spectrum of an exemplary star polymer having four polystyrene arms.
Figure 15:
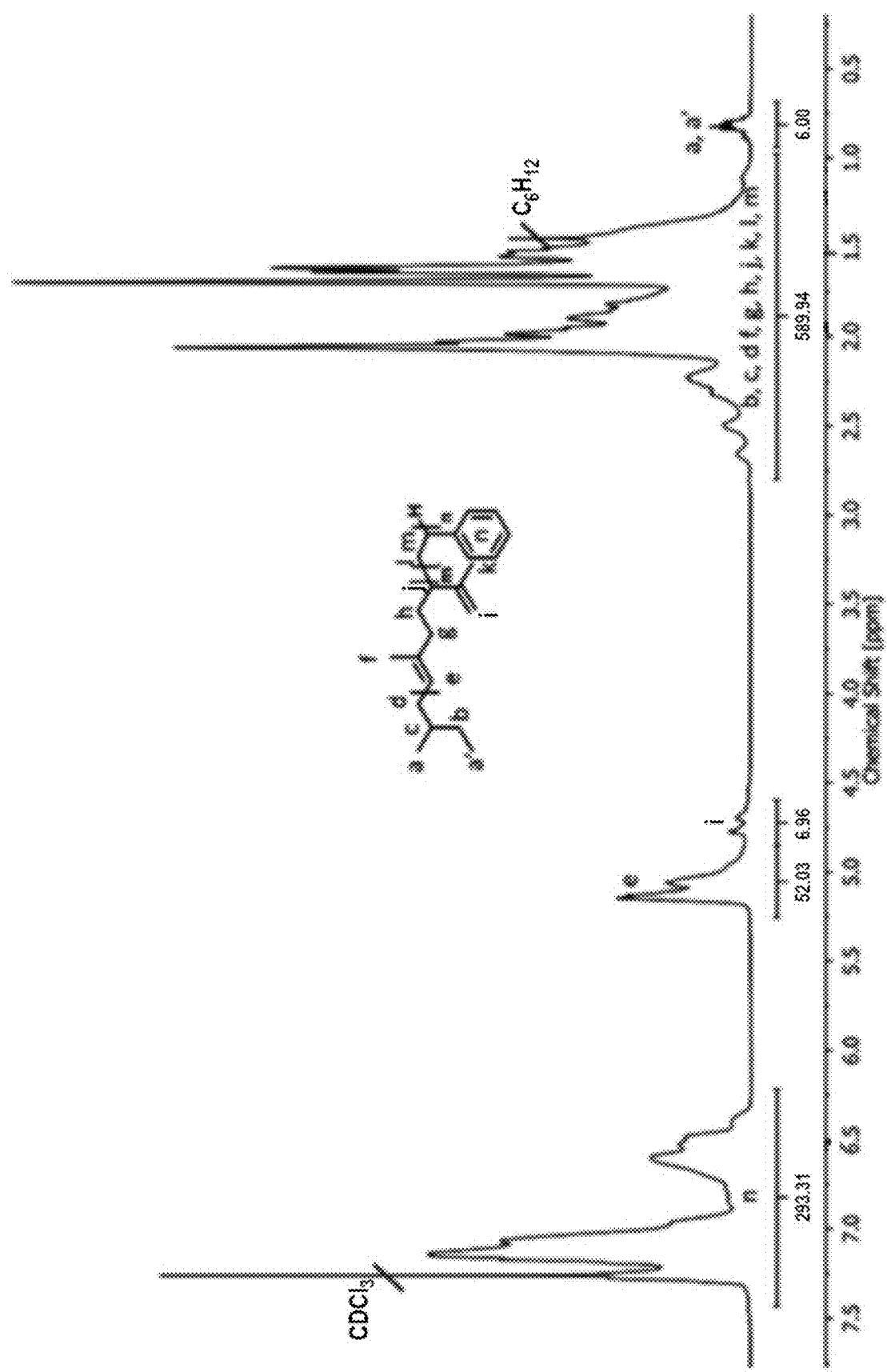
FIG. 15 is a graphical illustration of a $^1$H-NMR spectrum of an exemplary poly(isoprene-co-styrene) arm.
Figure 16:
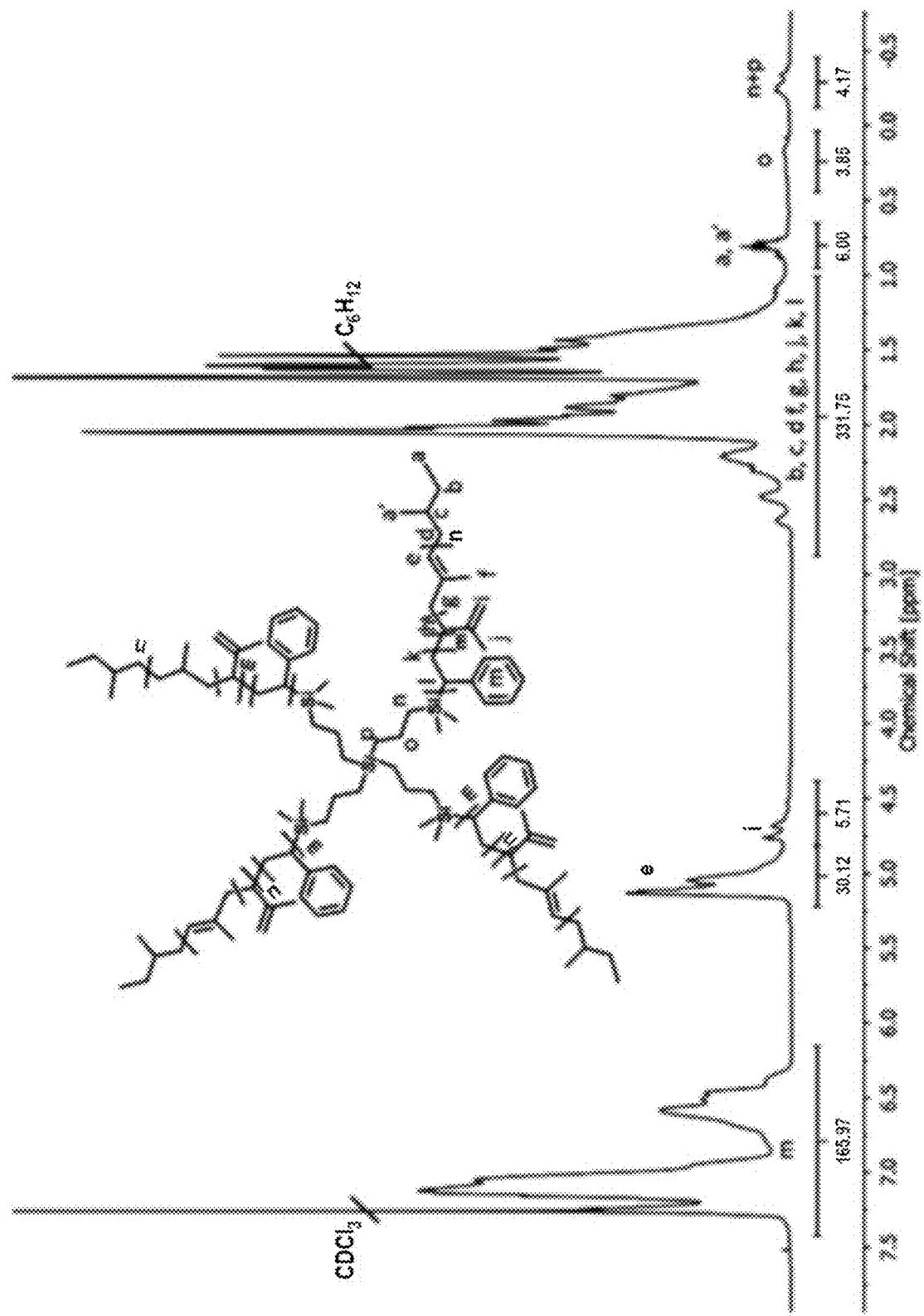
FIG. 16 is a graphical illustration of a $^1$H-NMR spectrum of an exemplary star polymer having four poly(isoprene-co-styrene) arms.
Figure 17:
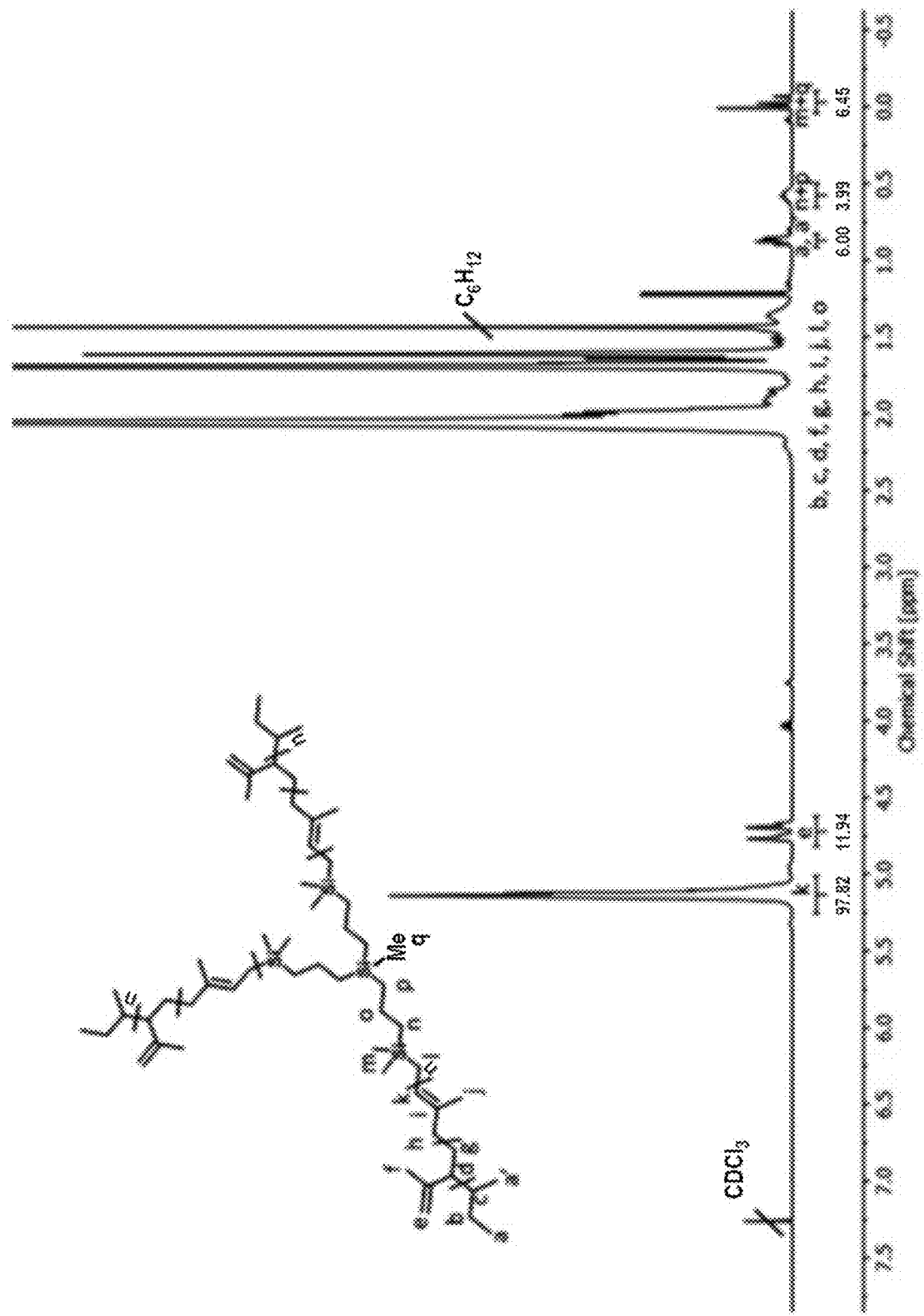
FIG. 17 is a graphical illustration of a $^1$H-NMR spectrum of an exemplary star polymer having three poly(isoprene) arms.
Figure 18:
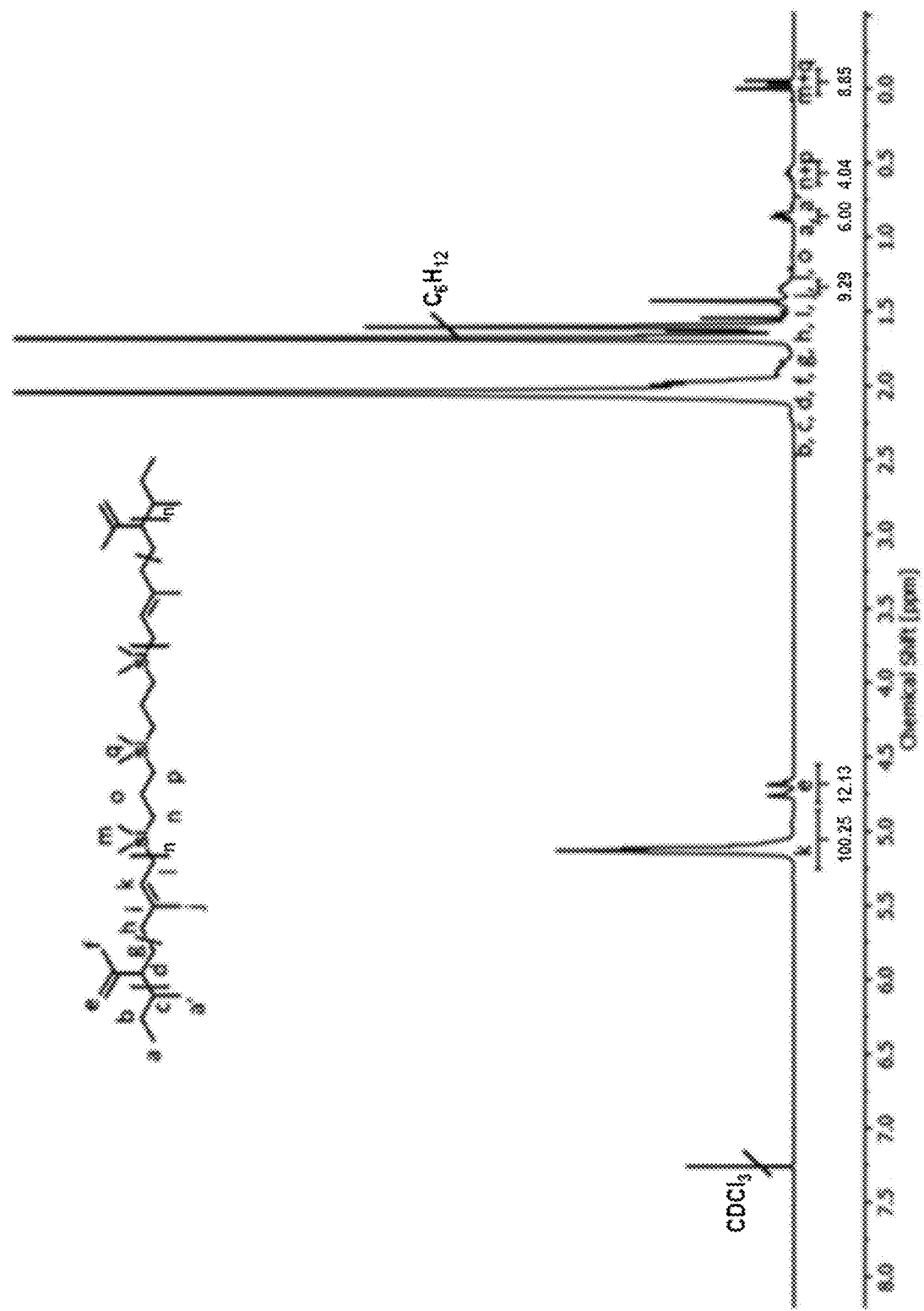
FIG. 18 is a graphical illustration of a $^1$H-NMR spectrum of an exemplary star polymer having two poly(isoprene) arms.

FIG. 6 to 18 show NMR spectra of cores/coupling reagents and their precursors and of star polymers. Specifically:

FIG. 6 shows a $^1$H-NMR spectrum of a tetraallylsilane precursor (400 MHz, CDCl$_3$);

FIG. 7 shows a $^1$H-NMR spectrum of a triallyl(methyl) silane precursor (400 MHz, CDCl$_3$);

FIG. 8 shows a $^1$H-NMR spectrum of a tetra[3-(dimethylchlorosilyl)propyl]silane core (400 MHz, CDCl$_3$);

FIG. 9 shows a $^1$H-NMR spectrum of a [(methylsilanetriyl)tris(propane-3,1-diyl)]tris(chlorodimethylsilane) core (400 MHz, CDCl$_3$);

FIG. 10 shows a $^{13}$C-NMR spectrum of a [(methylsilanetriyl)tris(propane-3,1-diyl)]tris(chlorodimethylsilane) core (400 MHz, CDCl$_3$);

FIG. 11 shows a $^1$H-NMR spectrum of a bis[3-(chlorodimethylsilyl)propyl]dimethylsilane core (400 MHz, C$_6$D$_6$);

FIG. 12 shows a $^{13}$C-NMR spectrum of a bis[3-(chlorodimethylsilyl)propyl]dimethylsilane core (400 MHz, C$_6$D$_6$);

FIG. 13 shows a $^1$H-NMR spectrum of a polystyrene arm (400 MHz, CDCl$_3$);

FIG. 14 shows a $^1$H-NMR spectrum of a star polymer having four polystyrene arms, a core derived from tetra[3-(dimethylchlorosilyl)propyl]silane and a nominal molar weight of 12 kg·mol$^{-1}$ (400 MHz, CDCl$_3$);

FIG. 15 shows a $^1$H-NMR spectrum of a poly(isoprene-co-styrene) arm having a nominal molar weight of 10 kg·mol$^{-1}$ (400 MHz, CDCl$_3$);

FIG. 16 shows a $^1$H-NMR spectrum of a star polymer having four poly(isoprene-co-styrene) arms, a core derived from tetra[3-(dimethylchlorosilyl)propyl]silane and a nominal molar weight of 40 kg·mol$^{-1}$ (400 MHz, CDCl$_3$);

FIG. 17 shows a $^1$H-NMR spectrum of a star polymer having three poly(isoprene) arms, a core derived from [(methylsilanetriyl)tris(propane-3,1-diyl)]tris(chlorodimethylsilane) and a nominal molar weight of 27 kg·mol$^{-1}$ (400 MHz, CDCl$_3$);

FIG. 18 shows a $^1$H-NMR spectrum of a star polymer having two poly(isoprene) arms, a core derived from bis[3-(chlorodimethylsilyl)propyl]dimethylsilane and a nominal molar weight of 18 kg·mol$^{-1}$ (400 MHz, CDCl$_3$).

Methods of Measurement

In the context of the present invention the weights and weight distributions of the arm and star polymers produced were determined by gel permeation chromatography (GPC/SEC) in tetrahydrofuran (THF) at a temperature in the range from 25° C. to 30° C., standard pressure (985-1010 hPa) and typical atmospheric humidity (40-100% rH) (source: Measuring station of the Institute for Atmospheric Physics, Johannes Gutenberg University Mainz).

Unless otherwise stated all chemicals and solvents were obtained from commercial suppliers (Acros, Sigma-Aldrich, Fisher Scientific, Fluka, Riedel-de-Haën, Roth) and—except for drying of the solvents and monomers—used without further purification. Deuterated solvents were obtained from Deutero GmbH (Kastellaun, Germany).

Gel Permeation Chromatoraphy (GPC/SEC)

GPC/SEC measurements were carried out according to DIN 55672-3 2016-01 at a temperature of 25° C. to 30° C. on an Agilent 1100 HPLC system with a refractive index detector (RI detector Agilent 2160 INFINITY®), UV detector (275 nm), online viscometer and an SDV column set (SDV 103, SDV 105, SDV 106) from Polymer Standard Service GmbH (referred to hereinbelow as PSS). Tetrahydrofuran (THF) was used as the solvent for the polymers to be analyzed and as an eluent with a volume flow of 1 ml min$^{-1}$. The THF-dissolved polymers for analysis were injected into the GPC column using a Waters 717 PLUS® autosampler. Calibration was carried out using polystyrene standards from PSS. Elugrams were evaluated using the software PSS WinGPC Unity from PSS.

NMR Spectroscopy $^1$H- and $^{13}$C-NMR spectra were recorded on an AVANCE® II 400 instrument (400 MHZ, 5 mm BBFO head with z-gradient and ATM) from Bruker at a frequency of 400 MHZ ($^1$H) or 101 MHz ($^{13}$C). Kinetic in situ 1H-NMR measurements were carried out using a Bruker AVANCE® III HD 400 spectrometer equipped with a 5 mm BBFO-SMARTPROBE® sensor (Z-gradient sensor), ATM and SAMPLEXPRESS® 60 autosampler. Chemical shifts are reported in ppm and relate to the proton signal of the deuterated solvent.

The invention claimed is:

1. A process for producing star polymers comprising the steps of
   (a) forming a polymer X by providing a reaction mixture comprising one or more solvents, p mol of an initiator $I^{(-)}Z^{(+)}$ and q mol of a monomer A or q mol of a monomer A and r mol of a monomer C where C≠A, wherein A and C are selected from the group consisting of dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether;
   (b) polymerizing A to afford I{poly(A)}$^{(-)}Z^{(+)}$ or polymerizing A and C to afford I{poly(A-stat-C)}$^{(-)}Z^{(+)}$ by living anionic polymerization;
   (c) optionally adding monomer B to the reaction mixture and living anionic polymerization of I{poly(A)}$^{(-)}Z^{(+)}$ to afford I{poly(A)poly(B)}$^{(-)}Z^{(+)}$, wherein B is selected from the group consisting of dienes, 1,3-butadiene, isoprene, polar vinyl monomers, vinylpyridines, vinyl ketones, acrylates, methacrylates, acrylonitrile, styrene, ethylene oxide, propylene oxide and 1-ethoxyethylene glycidyl ether and B≠A;
   (d) optionally adding monomer A to the reaction mixture and living anionic polymerization of I{poly(A)poly(B)}$^{(-)}Z^{(+)}$ to afford I{poly(A)poly(B)poly(A)}$^{(-)}Z^{(+)}$;
   (e) optionally performing the step sequence (c)-(d) a single or multiple times;
   (f) optionally performing step (c), thereby forming polymer X;
   (g) adding r mol of a core K to the reaction mixture and conjugating I{poly(A)}$^{(-)}$, I{poly(A-stat-C)}$^{(-)}$ or I{poly(A)-block-poly(B)}$^{(-)}$ with K to afford a star polymer [I{poly(A)}]$_m$K, [I{poly(A-stat-C)}]$_m$K or [I{poly(A)-block-poly(B)}]$_m$K;

wherein the core K has the structure

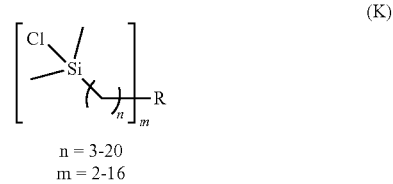

(K)

n = 3-20
m = 2-16 where m=2-16 coupling groups each having n=3-20 methylene groups and R is a radical of an m-fold functionalized compound.

2. The process as claimed in claim 1, wherein R is a radical of an alkane, aromatic, tertiary amine, cyclic tertiary amine, polymer, polyether, polysiloxane, block copolymer or of silicon.

3. The process as claimed in claim 1, wherein R is a radical of a telechelic oligomer having two functional end groups (m=2).

4. The process as claimed in claim 1, wherein R in tetrahydrofuran has a $pK_a$ of 20 to 100.

5. The process as claimed in claim 1, wherein the reaction mixture contains one or more solvents selected from the group consisting of benzene, hexane, cyclohexane, toluene, tetrahydrofuran and dioxane.

6. A star polymer produced by the process as claimed in claim 1.

7. A star polymer of structure P

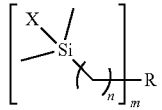

where m=2-16 arms each having n=3-20 methylene groups, wherein

R is a radical of an alkane, aromatic, tertiary amine, cyclic tertiary amine, polymer, polyether, polysiloxane, block copolymer or of silicon (Si); and X has the structure I{poly(A)}–, I{poly(A-stat-C)}– where C≠A or I{poly(A)-block-poly(B)}– where B≠A and A, C, B are selected from the group consisting of dienes, 1,3-butadiene, isoprene, polar vinyl monomers, vinylpyridines, vinyl ketones, acrylates, methacrylates, acrylonitriles, styrene, ethylene oxide, propylene oxide and 1-ethoxyethylene glycidyl ether.

8. The star polymer as claimed in claim 7, wherein said star polymer has a polydispersity $\overline{M}_w/\overline{M}_n \leq 2$.

9. The star polymer as claimed in claim 7, wherein said star polymer has a molar mass $M_w$ where 2000 g·mol$^{-1}$ $\leq M_w \leq$ 200000 g·mol$^{-1}$.

10. The star polymer as claimed in claim 7, wherein A, C, B are selected from 1,3-butadiene, styrene or isoprene.

11. The process as claimed in claim 1, wherein R is a radical of silane, methyl silane, dimethyl silane, triazine or telechelically functionalized polystyrene.

12. The process as claimed in claim 1, wherein the polymer X is added in an equimolar amount relative to the core K.

13. The process as claimed in claim 5, wherein the reaction mixture comprises tetrahydrofuran.

14. The process as claimed in claim 13, wherein the star polymer synthesis is completed within one hour or less.

15. The star polymer as claimed in claim 7, wherein R is a radical of silane, methyl silane, triazine or telechelically functionalized polystyrene.

* * * * *